(12) United States Patent
Wang et al.

(10) Patent No.: US 7,724,782 B2
(45) Date of Patent: May 25, 2010

(54) INTERVAL CENTROID BASED WATERMARK

(75) Inventors: Xinyuan Wang, Clifton, VA (US);
Shiping Chen, Dublin, CA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 176 days.

(21) Appl. No.: 12/051,882

(22) Filed: Mar. 20, 2008

(65) Prior Publication Data
US 2008/0232363 A1    Sep. 25, 2008

Related U.S. Application Data

(60) Provisional application No. 60/895,755, filed on Mar. 20, 2007.

(51) Int. Cl.
*H04L 9/32* (2006.01)
*H04J 3/00* (2006.01)
*H04J 3/06* (2006.01)

(52) U.S. Cl. ............... 370/514; 370/498; 370/503; 370/508; 370/509; 370/521; 713/176; 713/401; 713/500

(58) Field of Classification Search ......... 370/504–522; 713/176, 401, 500–501
See application file for complete search history.

(56) References Cited

U.S. PATENT DOCUMENTS

| | | | | |
|---|---|---|---|---|
| 6,683,958 B2* | 1/2004 | Petrovic | ............ | 380/238 |
| 2003/0227987 A1* | 12/2003 | Poletto et al. | ............ | 375/360 |
| 2004/0030902 A1* | 2/2004 | Asano et al. | ............ | 713/176 |
| 2004/0221161 A1* | 11/2004 | Rhoads | ............ | 713/176 |
| 2006/0239501 A1* | 10/2006 | Petrovic et al. | ............ | 382/100 |

* cited by examiner

*Primary Examiner*—Huy D Vu
*Assistant Examiner*—Maria L Sekul
(74) *Attorney, Agent, or Firm*—David G. Grossman; Esmael Dinan

(57) ABSTRACT

An interval centroid-based watermark encoder encodes a watermark into a packet flow. Intervals are defined for the packet flow. Some of the intervals are selected as group A intervals while other intervals are selected as group B intervals. Group A and group B intervals are paired and assigned to watermark bits. A first or second value may be encoded by increasing the relative packet time between packets in either the group A (for the first bit value) or group B (for the second bit value) interval(s) of the interval pair(s) assigned to the watermark bits that are to represent the first or second bit value and the beginning of the same group interval(s). The relative packet times may be measured by a decoder and used to calculate a centroid difference for each interval pair. The centroid differences may be used to reconstruct the watermark.

10 Claims, 26 Drawing Sheets

Intra-flow transformations
FIG. 1A — Original / Chaff Added
FIG. 1B — Original / Packet Dropped (De-Chaff)
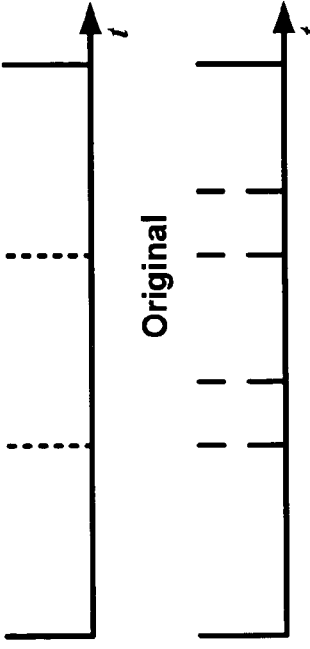
FIG. 1C — Original / Repacketization Packet Merge
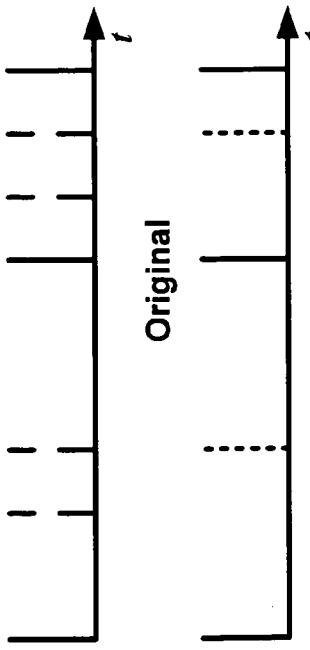
FIG. 1D — Original / Repacketization Fragmentation

Inter-flow transformations

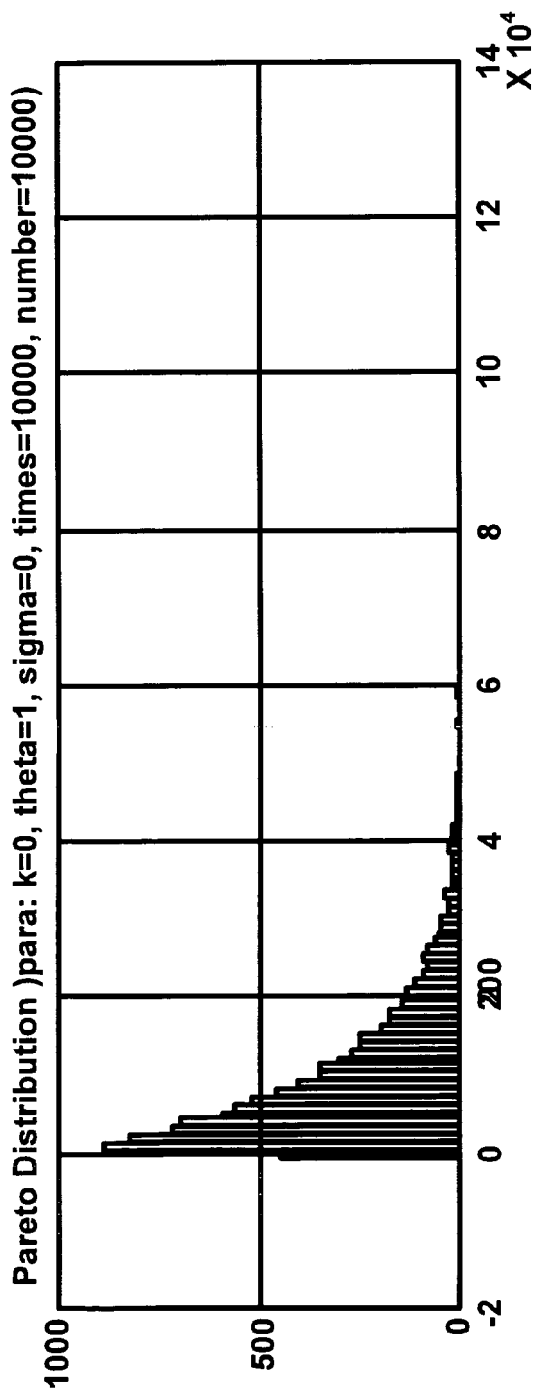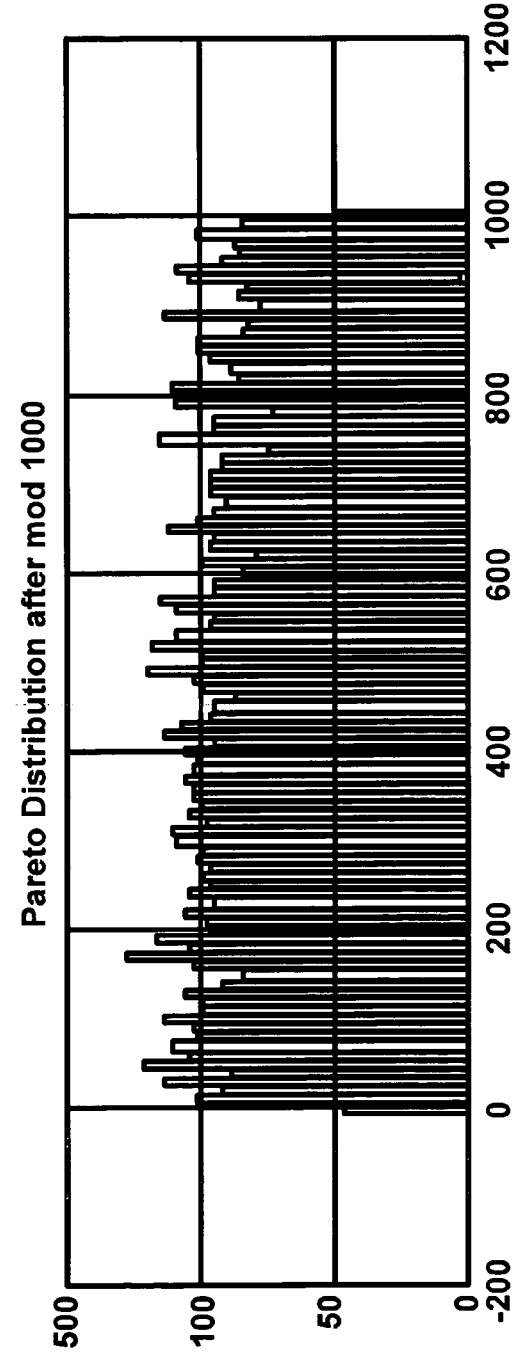
FIG. 4

| Redundancy Number | | 12 | 14 | 16 | 18 | 20 |
|---|---|---|---|---|---|---|
| Average Number of Packets | from server | 3748 | 4301 | 4745 | 5246 | 5489 |
| | to client | 3356 | 3384 | 4332 | 4774 | 5031 |
| Packet Number Ratio | | 89.54% | 90.34% | 91.29% | 91.00% | 91.66% |
| Average Packet Rate (Pkt/sec) | from server | 8.83 | 8.90 | 8.83 | 8.57 | 8.19 |
| | to client | 7.88 | 8.02 | 8.05 | 7.79 | 7.54 |
| Packet Rate Ratio | | 89.24% | 90.11% | 91.17% | 90.90% | 92.06% |
| Average Packet Size (Byte) | from server | 801.84 | 806.45 | 804.52 | 812.73 | 814.09 |
| | to client | 354.28 | 349.18 | 351.89 | 346.80 | 353.85 |
| Packet Size Ratio | | 44.18% | 43.30% | 43.74% | 42.67% | 43.47% |
| Average Information Flow Rate (Byte/sec) | from server | 7080.23 | 7177.37 | 7103.87 | 6965.11 | 6667.36 |
| | to client | 2791.69 | 2800.45 | 2832.69 | 2701.56 | 2668.04 |
| Information Flow Rate Ratio | | 39.43% | 39.01% | 39.88% | 38.79% | 40.02% |

Packet Flow Statistics of Online Experiments

FIG. 11

Unidirectional customer-specific server verification

Bidirectional verification

INTERVAL CENTROID BASED WATERMARK

CROSS-REFERENCE TO RELATED APPLICATIONS

This application claims the benefit of U.S. Provisional Application No. 60/895,755 filed Mar. 20, 2007, entitled "Transparent Authentication of Continuous Data Streams without Communications Overhead," which is hereby incorporated by reference in its entirety.

STATEMENT REGARDING FEDERALLY SPONSORED RESEARCH OR DEVELOPMENT

This invention was made with government support under CNS-0524286 awarded by the National Science Foundation, and Grant #FA8750-05-2-0266 awarded by the DTO/ARDA/AFRL. The government has certain rights in the invention.

BACKGROUND

Privacy and anonymity have become major concerns as people become increasingly dependent on the Internet in their daily lives. For example, people sometimes do not want others to know what Web sites they have visited. Under certain circumstances, people want to remain anonymous to the Web sites they have visited so that their personal interests can not be profiled by the Web sites. To address these privacy concerns, a number of anonymous communication systems (e.g. DC-Net [7]Anonymizer.com [1], Crowds [25], Onion Routing [24], Tor [9], Hordes [27], Web Mixes [3]) have been designed to provide anonymity to the communicating parties.

According to Pfitzmann and Waidner [23], there are three types of anonymities that can be provided by anonymous communication systems: sender anonymity, receiver anonymity, and unlinkability of sender and receiver. Sender anonymity means that the identity of the information sender is hidden, and receiver anonymity means that the identity of the information receiver is hidden. Unlinkability of sender and receiver refers to the property that the sender and receiver of a communication cannot be identified even if the sender and receiver are known to be of communicating with someone. Since anonymity is the state of lacking identity, anonymous communication can only be achieved by removing all the identifying characteristics from the anonymized network flows.

It's well known that encryption alone is not adequate to achieve anonymity. For example, various traffic analysis techniques [33, 32, 10, 31, 30] have been shown to be able to uniquely identify encrypted flows. These traffic analysis techniques can be used to link the encrypted flow to its original information sender and receiver, which would break the sender and receiver anonymity as well as the unlinkability of sender and receiver.

Traditional methods of achieving anonymity in communication include using proxies [24, 25, 9], MIXes [6, 17, 3], and various other flow transformations such as adding cover traffic, packet dropping, flow mixing, flow splitting, and flow merging. Since these flow transformations drastically change the original network flow, it is generally believed that these flow transformations would remove most, if not all, identifying characteristics of the original flow and make it indistinguishable from some other independent network flow. For example, cover traffic has long been believed to be able to prevent the adversary from using traffic analysis to uniquely identify the covered flow and link the information sender and receiver. A number of works [16, 15, 12] have used cover traffic to achieve anonymity. In addition, Blum et al. [5] claimed that a packet flow would become indistinguishable from other independent packet flows if the ratio of the cover traffic added to the original flow reaches certain threshold. They further claimed that their hardness result regarding the traffic analysis holds true even if the adversary is active.

There are fundamental limitations of flow transformations in anonymizing packet flows by taking the role of active adversary. What is needed is a mechanism for uniquely identifying a packet flow in spite of various flow transformations that may be used to link an anonymized packet flow to its original flow thus breaking the anonymity of the packet flow.

BRIEF SUMMARY

Brief Description of the Several Views of the Drawings

FIG. 1A is a diagram showing an intra-flow transformation where Chaff is added to an original packet flow.

FIG. 1B is a diagram showing an intra-flow transformation where packets are dropped (de-chaff) from an original packet flow.

FIG. 1C is a diagram showing a repacketization intra-flow transformation where packets in an original packet flow are merged.

FIG. 1D is a diagram showing a repacketization intra-flow transformation where packets in an original packet flow are fragmented.

FIG. 4 is a plot showing empirical distributions of the remainders of modulo 1000 operations over exponentially distributed random variables.

FIG. 11 is a table that shows statistics of Web traffic collected during real-time experiments using an aspect of an embodiment of the present invention.

DETAILED DESCRIPTION OF EMBODIMENTS

Figure 2A:
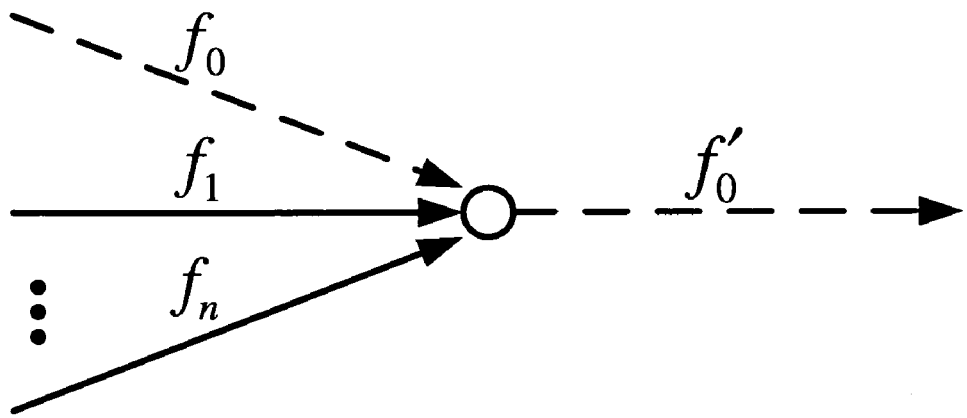
FIG. 2A is a diagram showing inter-flow transformations where multiple packet flows are combined into a single packet flow.

Embodiments of the present invention are interval centroid-based watermark encoder and decoders that exploit the fundamental limitation of low-latency anonymous communication systems that low-latency anonymizing systems do not eliminate the packet timing correlation between the anonymized flow and the original flow. Therefore, there exists mutual information in the packet timing domain between the anonymized flow and the original flow. Such mutual information forms the very foundation for the unique identification and tracking the anonymized flow.

A technique used in embodiments of the present invention is to transparently watermark the packet flow by slightly adjusting the timing of selected packets. If the embedded unique watermark survives various flow transformations, the watermarked network flow can be uniquely identified and thus linked to it original sender and receiver. This network flow watermarking technique may be used to attack low-latency anonymous communication systems without global monitoring capability. To break the unlinkability of sender and receiver, one only needs to monitor and perturb the network flows to and from potential senders and receivers to verify the packet flow. For example, a malicious Web site could watermark the Web traffic returned to its visitors, and determine if some suspected user has visited its Web site by checking if that user has received the (potentially anonymized) watermarked traffic. With appropriate monitoring capability, the presently disclosed embodiments for flow watermarking may also be used to attack the sender and receiver anonymity.

By developing a novel flow watermarking technique, a rather surprising result was discovered on the inherent limits of flow transformations in anonymizing long network flows. The analysis shows that adding cover traffic, dropping packets, mixing or merging with other flows, and splitting into multiple subflows, do not necessarily make a long network flow indistinguishable from other independent flows. In fact, a sufficiently long flow could be uniquely identified the presently disclosed embodiments even if the amount of cover traffic added is many times more than the number of original packets. This result is in contrast to many people's intuition. This claim is backed by extensive offline experimental results and real-time experimental results on a leading commercial anonymizing service. In particular, embodiments were able to "penetrate" the Total Net Shield, the "ultimate solution in online identity protection" of www.anonymizer.com. It took less than 11 minutes of active surfing traffic from www.usatoday.com to achieve virtually 100% true positive rate and less than 0.3% false positive rate at the same time in linking the sender and receiver of the Web traffic that was anonymized by the Total Net Shield of www.anonymizer.com. The analytical and empirical results demonstrate that 1) the anonymity provided by low-latency anonymous communication systems is fundamentally limited, 2) there exists practical attack to break the anonymity provided by existing low-latency anonymous communication systems, and 3) existing low latency anonymous communication systems need to be revisited.

Network Flow Identification and Anonymous Communication

In this section, the network flow identification problem is formulated in the context of network information flow, and elaborate on the relationship between the network flow identification and anonymous communication by reviewing the flow transformations used in existing anonymous communication systems.

Network Information Flow and Network Flow Identification

A network generally has multiple network flows between different nodes. Some network flows are essentially correlated with each other in that they are part of the transmission of the same information. For example, multicast flows from the same source are essentially correlated if they convey the same information. All of the connections in a connection chain across stepping stones are essentially correlated since those connections have the same essential payload even if the payload is encrypted.

Here, network information flow is used to represent the transmission path of some information along the network. Therefore, any communication between different nodes in a network, whether it has single or multiple sources/destinations, is a network information flow. A network information flow may consist of multiple network flows which may appear very different due to various flow transformations. As indicated by the multicast example, a network information flow is not necessarily linear.

A generic problem of network information flow is how to determine those network flows that belong to any particular network information flows. This problem is defined as the networkflow identification problem.

Network flow identification is inherently related to anonymous communication whose goal is to conceal the true identities and relationships among the communicating parties. For example, if one can identify and authenticate those network flows that belong to any particular network information flow, then it may be possible to link a network flow to its information source and destination. Thus, one can link the information sender and receiver.

Anonymous Communication and Transformations of Network Flow

To conceal the true identities and relationships among the communicating parties, anonymous communication systems usually mix multiple network information flows among multiple communicating parties and transform each network flow substantially. If the transformed network flows do not have any identifying characteristics that can be linked to their information sources or destinations, anonymity will be achieved.

Existing network flow transformations used by current anonymous communication systems can be broadly divided into two categories: intra-flow transformations and interflow transformations. The intra-flow transformations are those transformations that are within the boundary of the flow without involving any other flow during the transformation. Interflow transformations are those that involve more than one flow.

FIG. 1A, FIG. 1B, FIG. 1C and FIG. 1D illustrate most common forms of intra-flow transformation: adding chaff (FIG. 1A), packet dropping (FIG. 1B), and repacketization (FIG. 1C and FIG. 1D). Here, an assumption may be made that all the network flows have been encrypted, and that the timing perturbation and packet reordering is not shown in the figure. Reordering of encrypted packets may be equivalent to timing perturbation of encrypted packets from an outsider's point of view, and a number of works [33, 32, 10, 30, 29] have addressed the timing perturbation of encrypted flows. Here, chaff refers to any bogus packet added to the flow that was not part of the original flow. For example, any cover traffic used in anonymous communication systems [12, 15] is chaff. Packet dropping can happen naturally, but it may be introduced deliberately as an effort to achieve anonymity [19]. Repacketization can either combine two or more closely adjacent packets into a larger packet (FIG. 1C) or split a packet into multiple smaller packets (FIG. 1D). Both forms of repacketization can occur naturally and be triggered deliberately. For example, SSH is known to combine closely adjacent packets into larger packets. IP fragmentation happens when the packet size is larger than the Maximum Transmission Unit (MTU) along the transmission path. Without considering the packet size, one can view two forms of repacketization as either chaff (FIG. 1A) or de-chaff (FIG. 1B).

Figure 2B:
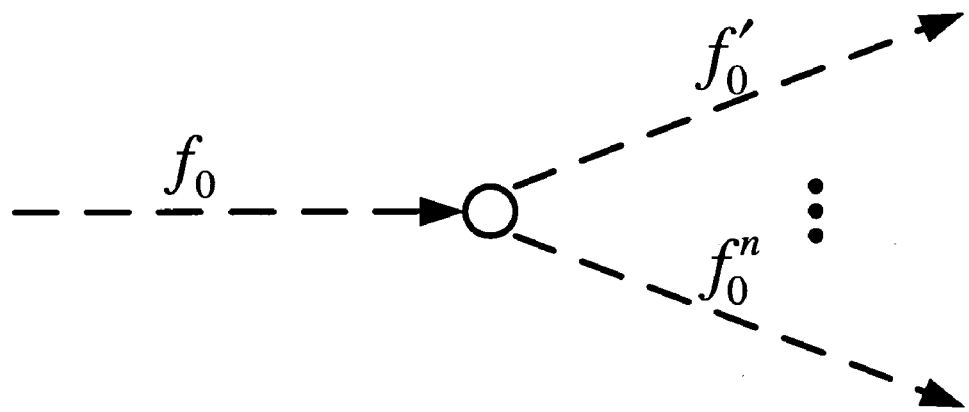
FIG. 2B is a diagram showing inter-flow transformations where a single packet flow is broken up into multiple packet flows.
Figure 2C:
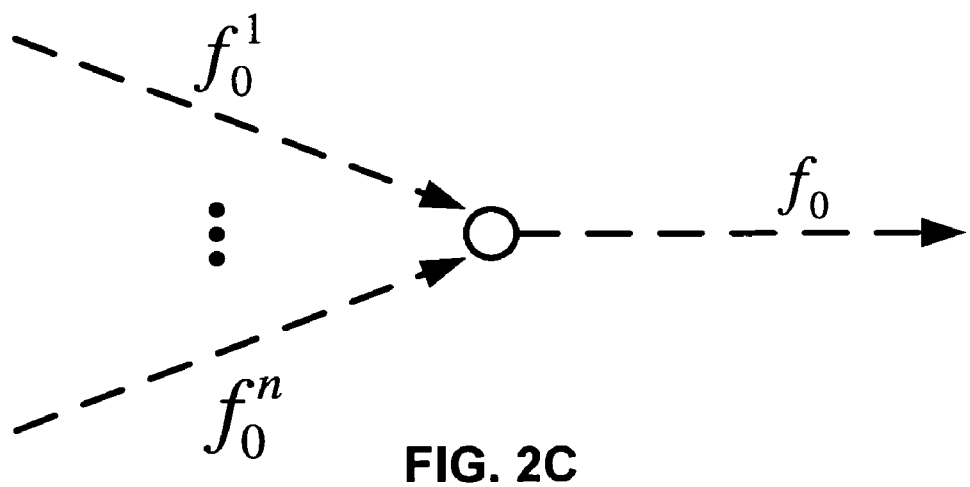
FIG. 2C is a diagram showing inter-flow transformations where a fragmented packet flow is combined into a single packet flow.

FIG. 2A, FIG. 2B and FIG. 2C illustrates most common forms of inter-flow transformation: flow mixing (FIG. 2A), flow splitting (FIG. 2B) and flow merging (FIG. 2C). Flow mixing refers to mixing some flow $f_0$ with some unrelated flows: $f_1, \ldots, f_n$ to generate mixed flow $f'_0$. To further frustrate any flow correlation, a flow $f_0$ could be split into multiple subflows: $f_0^1, \ldots, f_0^n$, which could be later merged. The difference between flow mixing and flow merging is that flow mixing combines a flow with unrelated flows, and flow merging combines a flow with flows that belong to the same network information flow. When all of the network flows are encrypted, flow mixing and flow merging appear the same. Furthermore, the flows $f_1, \ldots, f_n$ mixed with flow $f_0$ in FIG. 2A (flow mixing) and flows $f_0^2, \ldots, f_0^n$ merged with flow $f'_0$ in FIG. 2C (flow merge) can be thought as chaff added to flow $f_0$ and $f'_0$, respectively. On the other hand, flow splitting can be thought as a form of packet dropping (or de-chaffing) from the subflow's point of view.

Since these flow transformations would change one flow into a very different flow, many people intuitively believe that these changes would make one flow virtually indistinguishable from other flows. Many existing low-latency anonymous communication systems have used variations of the above flow transformations in addition to any cryptographic operations they may use. For example, Onion Routing [24] uses packet padding, and Tor [9] uses a fixed-size cell which requires repacketization. Both NetCamo [15] and Tarzan [12] deliberately introduce chaff to anonymize the network traffic. Work [19] uses random packet dropping as a means to achieve anonymity in the presence of active timing attacks. Hordes [27] uses multicast, which can be thought as a variation of flow splitting, to provide initiator (or sender) anonymity. All mix based anonymizing systems [4, 22, 17] use some sort of repacketization, packet reordering, or flow mixing to achieve sender anonymity, the receiver anonymity, or the unlinkability of sender and receiver.

Therefore, whether or not one could uniquely identify a network flow despite these flow transformations is a key problem that has a direct impact on some of the very foundations of existing anonymizing techniques. In the rest of this disclosure, it will be shown that the combination of chaff, packet dropping, repacketization, flow mixing, and flow splitting does not necessarily make one flow indistinguishable from others.

Interval Centroid Based Watermarking Scheme

This disclosure presents novel watermarking embodiments that could make a sufficiently long flow uniquely identifiable even after significant transformations have occurred, such as by adding chaff, packet dropping, flow mixing, and flow splitting/merging. First, basic concepts and notions will be discussed, and then the watermark encoding and decoding processes will be disclosed. An upper bound may be established on the decoding error probability assuming there is no active countermeasures. In the rest of this disclosure, the terms "packet flow" and "network flow" are used interchangeably.

Time Interval and Centroid of Interval

Given a packet flow of duration $T_f>0$, one may want to embed l-bit watermark with redundancy $r>0$. Starting from offset $o>0$, a duration $T_d$ may be chosen and divided into $2n$ (where $n=r\times l$) intervals of length $T$ ($T>0$): $I_0, \ldots, I_{2n-1}$. Assume there are $n_p>0$ packets $P_1, \ldots, P_{n_p}$ in the $2n$ intervals. Let $t_i$ ($i=1, \ldots, n_p$) represent the absolute time stamp of packet $P_i$, and $t_0$ be the absolute time stamp of the start point of the first interval. Then $t'_i=t_i-t_0$ is the relative time stamp of $P_i$ from the starting point of the first interval. Apparently, packet $P_i$ would occur within interval $\lfloor t'_i/T \rfloor$.

$P_i$'s relative position within its interval is of interest, and $\Delta t_i$ is used to represent the $P_i$'s offset from the start point of its interval. $\Delta t_i$ may be described as:

$$\Delta t_i = t'_i \bmod T \quad (1)$$

Therefore, in this example, dividing a duration $T_d$ of a packet flow into equal size intervals is essentially a modulo operation, and the packets' relative positions within their respective intervals are essentially the remainders of the modulo operations on those packets in duration $T_d$. However, other embodiments may divide the intervals into unequal sizes. This may be useful in situations when the packet flow has intervals with few packets.

Figure 3:
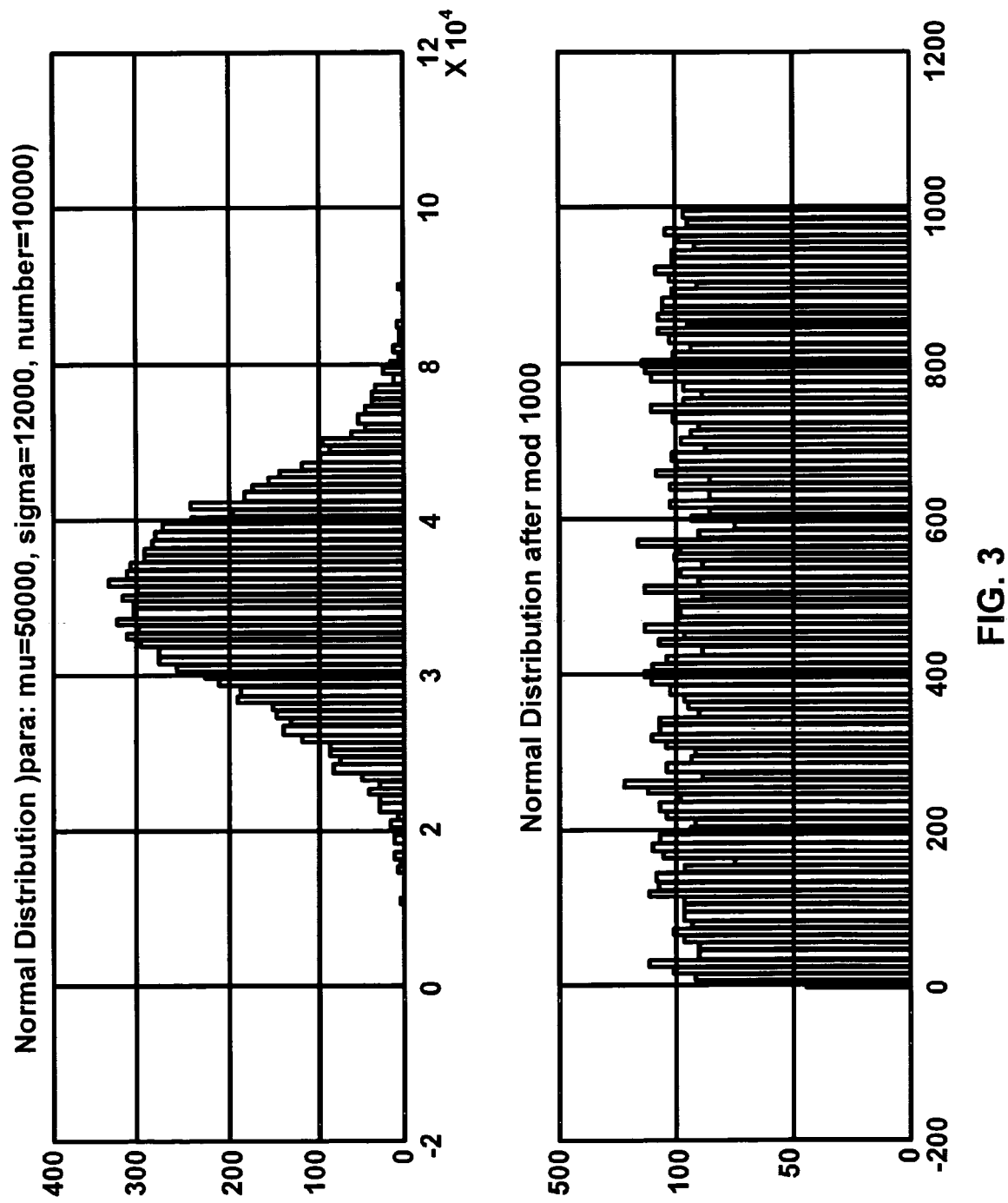
FIG. 3 is a plot showing empirical distributions of the remainders of modulo 1000 operations over normally distributed random variables.

Given any particular sequence of time stamps $t'_1, \ldots, t'_{n_p}$ and a random interval length $T>0$, when $T<<t'_{n_p}-t'_1$ and $n$ are large, $\Delta t_i = t'_i \mod T$ is approximately uniformly distributed in range [0,T). FIG. 3 and FIG. 4 show the empirical distributions of the remainders of modulo 1000 operations over normally and exponentially distributed random variables, respectively. They clearly show that the remainder of modulo operation over random variables of different distributions is approximately uniformly distributed.

In other words, given any packet flow with sufficient packets, any randomly chosen offset o>0 and any interval size T>0, the relative positions of all packets within their respective intervals ($\Delta t_i$) are uniformly distributed.

Therefore, the expected value of $\Delta t_i$ is $$E(\Delta t_i) = \frac{T}{2} (i = 1, \ldots, n) \quad (2)$$

and the variance of $\Delta t_i$ is $$\mathrm{Var}(\Delta t_i) = \frac{T}{12} (i = 1, \ldots, n) \quad (3)$$

Assuming interval $I_i$ (i=0, ..., 2n−1) has $n_i$>0 packets $$P_{i_0}, \ldots, P_{i_{n_i-1}},$$

we are interested in the "balance point" of those packets in each interval $I_i$. The centroid of interval $I_i$ (i=0, ..., 2n−1) may be defined as $$\mathrm{Cent}(I_i) = \frac{1}{n_1} \sum_{j=0}^{n_i-1} \Delta t_{i,j} \quad (4)$$

In case interval $I_i$ is empty, may be defined as Cent($I_i$) to be T/2. Other definitions may also be used in differing embodiments.

Random Grouping and Assignment of Intervals

Figure 5:
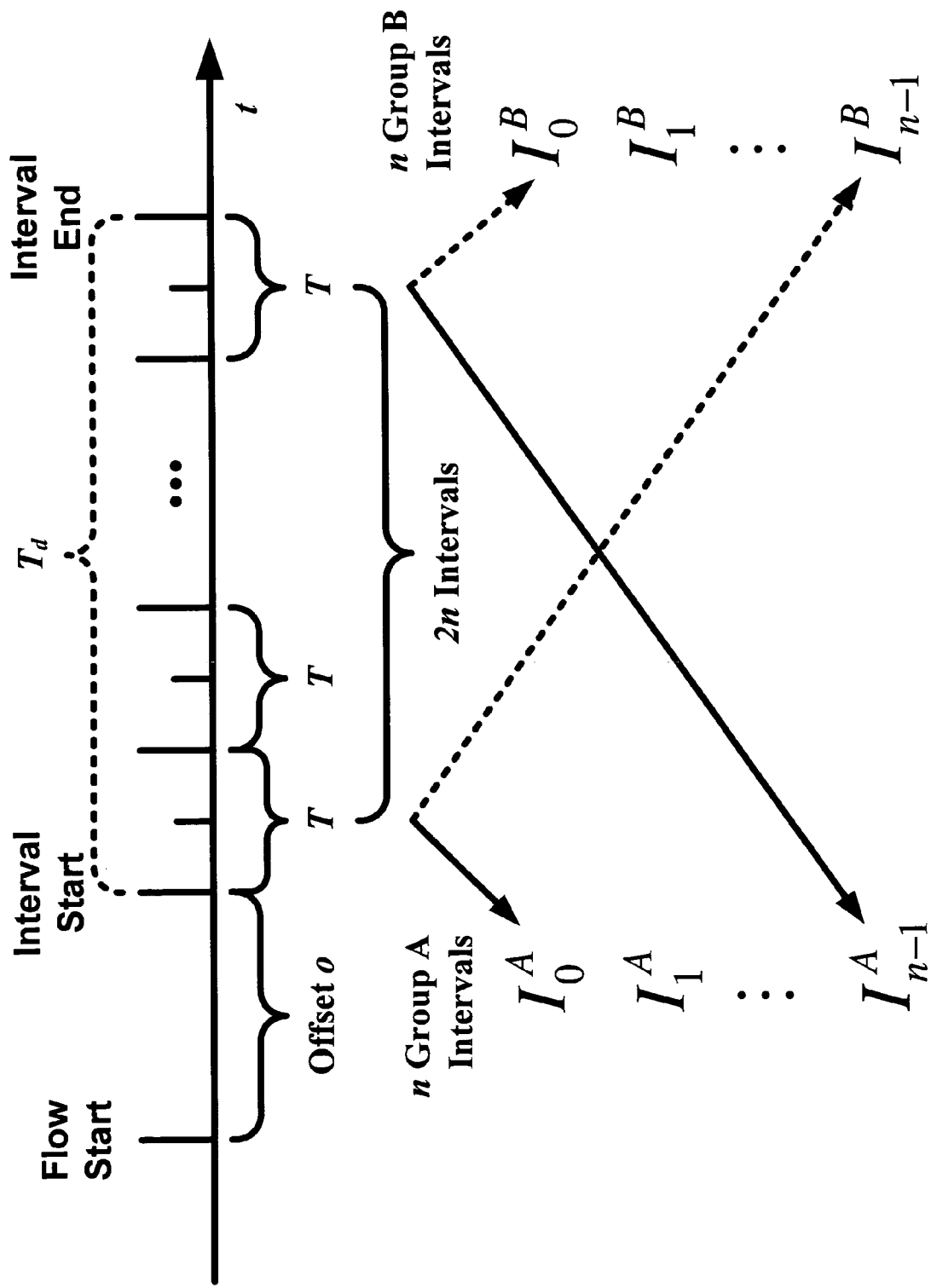
FIG. 5 is a diagram showing the random grouping of time intervals of a packet flow as per an aspect of an embodiment of the present invention.

The following process may be used to independently and randomly choose n intervals out of the 2n intervals: (1) sequentially scan each of the 2n intervals and (2) independently and randomly choose the current interval with probability 0.5. One may expect to have n intervals randomly chosen. The n chosen intervals may be designated as group A intervals and denoted as $I_k^A$ (k=0, ..., n−1). The rest of the n intervals may be designated as group B intervals and denoted as $I_k^B$ (k=0, ..., n−1). FIG. 5 shows the random grouping of the time intervals of a packet flow. Apparently, there are $$\frac{(2n)!}{n!n!}$$

such equal groupings.

Figure 6:
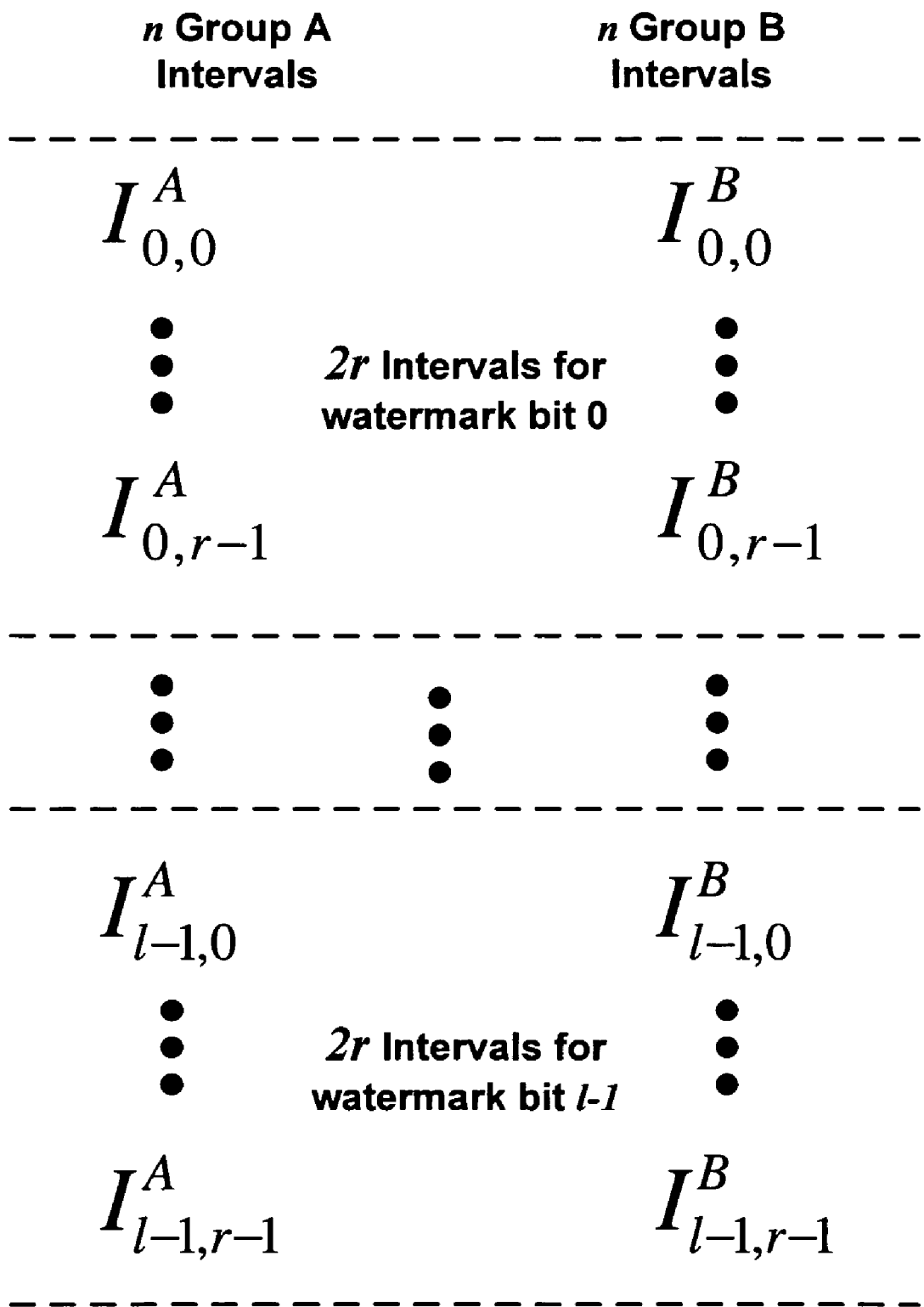
FIG. 6 is a diagram illustrating the random assignment of time intervals for embedding different watermark bits as per an aspect of an embodiment of the present invention.

Now one may randomly determine which intervals ($I_k^A$ and $I_k^B$, k=0, ..., n−1) will be used for encoding watermark bit i (i=0, ..., l−1). One may then scan each of $I_k^A$ (k=0, ..., n−1) and randomly assign, with probability 1/l, the current interval for encoding watermark bit i (i=0, ..., l−1). Then, one may expect to have $$r = \frac{n}{l}$$

group A intervals assigned for each watermark bit. The j-th (j=0, ..., r−1) group A interval assigned for watermark bit i (i=0, ..., l−1) may be denoted as $I_{i,j}^A$. Similarly, each $I_k^B$ (k=0, ..., n−1) may be randomly assigned for encoding watermark bit i (i=0, ..., l−1), and the j-th (j=0, ..., r−1) group B interval assigned for watermark bit i (i=0, ..., l−1) may be denoted as $I_{i,j}^B$. FIG. 6 illustrates the random assignment of the time intervals for embedding different watermark bits. There are totally $$\frac{n!}{(r!)^l}$$

different such assignments.

We use $N_{i,j}^A$ and $N_{i,j}^B$ to represent the total packet numbers in interval $I_{i,j}^A$ and $I_{i,j}^B$, respectively. Let $$N_i^A = \sum_{j=0}^{r-1} N_{i,j}^A \text{ and } N_i^B = \sum_{j=0}^{r-1} N_{i,j}^B$$

Then $N_i^A$ and $N_i^B$ represent the total packet number of group A and B intervals, respectively, assigned for encoding watermark bit i.

Since, in this example, each interval was assigned randomly, with equal probability, to group A and B, and each group A and B intervals were randomly assigned, with equal probability, for encoding each watermark bit, each of the 2n intervals has equal probability to be assigned for each watermark bit. In particular, each interval has $$\frac{r}{2n} = \frac{1}{2l}$$

probability to be assigned for encoding watermark bit i as one of the $I_{i,j}^A$ (j=0, ..., r−1), and each interval has $$\frac{r}{2n} = \frac{1}{2l}$$

probability to be assigned for encoding watermark bit i as one of the $I_{i,j}^B$ (j=0, ..., r−1). In addition, each of $I_{i,j}^A$ and each of $I_{i,j}^B$ have equal probability to have each of the $n_p$ packets. Therefore, the expected numbers of packets in group A and B intervals for encoding watermark bit i are $$E(N_i^A) = E(N_i^B) = \frac{n_p}{2l} \quad (5)$$

Watermark Encoding and Decoding

In this section, embodiments of the encoding and decoding processes of the interval centroid based watermarking scheme are presented, and an upper bound on the watermark decoding error probability is established.

Given a packet flow, offset o>0 and interval size T, one can have 2r intervals $I_{i,j}^A$ and $I_{i,j}^B$ (j=0, . . . , r−1) randomly grouped and assigned to encode watermark bit i (i=0, . . . , l−1). To encode or decode a watermark bit, all of the time stamps in the r group A and group B intervals ($I_{i,j}^A$ and $I_{i,j}^B$) may be aggregated respectively, and the centroids of those packets calculated.

Let $$A_i = \frac{\sum_{j=0}^{r-1}[N_{i,j}^A Cent(I_{i,j}^A)]}{\sum_{j=0}^{r-1} N_{i,j}^A} = \frac{\sum_{j=0}^{r-1}\sum_{k=0}^{N_{i,j}^A-1}\Delta t_{i,j,k}^A}{N_i^A} \quad (6)$$

and $$B_i = \frac{\sum_{j=0}^{r-1}[N_{i,j}^B Cent(I_{i,j}^B)]}{\sum_{j=0}^{r-1} N_{i,j}^B} = \frac{\sum_{j=0}^{r-1}\sum_{k=0}^{N_{i,j}^B-1}\Delta t_{i,j,k}^B}{N_i^B} \quad (7)$$

where $\Delta t_{i,j,k}^A$ and $\Delta t_{i,j,k}^B$ represent the k-th packet in interval $I_{i,j}^A$ and $I_{i,j}^B$, respectively.

Here, $A_i$ and $B_i$ are aggregated centroids of group A and B packets, respectively, assigned for encoding and decoding watermark bit i, and they are actually the sample means of those $N_i^A$ $\Delta t_{i,j,k}^A$ s and $N_i^B$ $\Delta t_{i,j,k}^A$ s respectively, that fall within those r group A and B intervals $I_{i,j}^A$ and $I_{i,j}^B$ (j=0, . . . , r−1).

$$\text{Since } E(\Delta t_{i,j,k}^A) = E(\Delta t_{i,j,k}^B) = \frac{T}{2}, \text{ then } E(A_i) = E(B_i) = \frac{T}{2} \quad (8)$$

watermark bit i may be encoded and decoded into the difference between $A_i$ and $B_i$. Let $$Y_i = A_i - B_i \quad (9)$$

then $E(Y_i)=0$ and $Y_i$ is symmetric around zero.

Watermark Encoding

To encode bit '1', $A_i$ maybe deliberately increased so that $Y_i$ will be more likely to be positive than negative. Similarly, to encode bit '0', $B_i$ may be deliberately increased so that $Y_i$ will be more likely to be negative than positive.

To increase $A_i$ or $B_i$, one can simply delay each packet within each interval $I_{i,j}^A$ or $I_{i,j}^B$. Let 0<a<T be the maximum delay to be applied, $\Delta t_{i,j,k}$ be packet $P_{i,j,k}$'s offset from the start of its interval $I_{i,j}$, and $\Delta t'_{i,j,k}$ be the resulting offset after $P_{i,j,k}$ has been delayed. We delay packet $P_{i,j,k}$ according to the following strategy $$\Delta t'_{i,j,k} = a + \frac{(T-a)\Delta t_{i,j,k}}{T} \quad (10)$$

Figure 7:
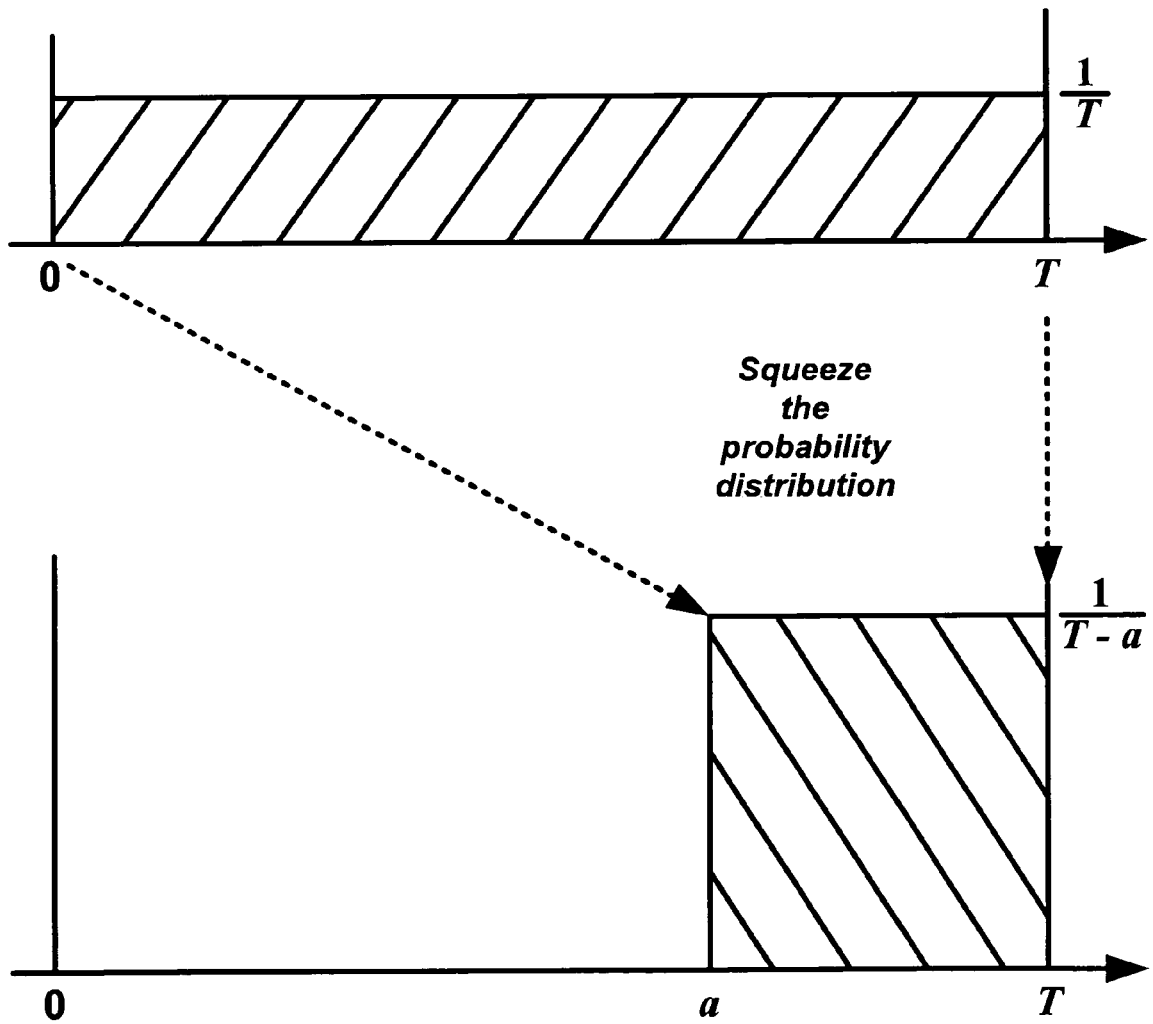
FIG. 7 is a diagram illustrating the effect of the packet delay strategy over the distribution of packets within an interval of size T as per an aspect of an embodiment of the present invention.

Since $\Delta T_{i,j,k}$ is uniformly distributed on range [0, T), $\Delta t'_{i,j,k} \in [a, T)$. In fact, $\Delta t'_{i,j,k}$ is uniformly distributed[1] on range [a, T). In other words, the delay strategy actually "squeezes" the original uniform distribution of $\Delta t_{i,j,k}$ from range [0, T) to range [a, T). FIG. 7 illustrates the effect of the packet delay strategy over the distribution of packets within an interval of size T.

Let A' and B' be the random variables that denote the resulting values of $A_i$ and $B_i$, respectively, after all the packets in $I_{i,j}^A$ and $I_{i,j}^B$ (j=0, . . . , r−1) have been delayed according to equation 10. Then one has $$E(A'_i) = E(B'_i) = \frac{T+a}{2} \quad (11)$$

Using $Y_i^1 = A'_i - B_i$ to represent the resulting value of $Y_i$ after bit '1' is encoded by increasing $A_i$ and we use $Y_i^0 = A_i - B'_i$ to represent the resulting value of $Y_i$ after bit '0' is encoded by increasing $B_i$. One has $$E(Y_i^1) = \frac{a}{2} \quad (12)$$

and $$E(Y_i^0) = -\frac{a}{2}$$

where $$N_i = \min(N_i^A, N_i^B).$$

Figure 8:
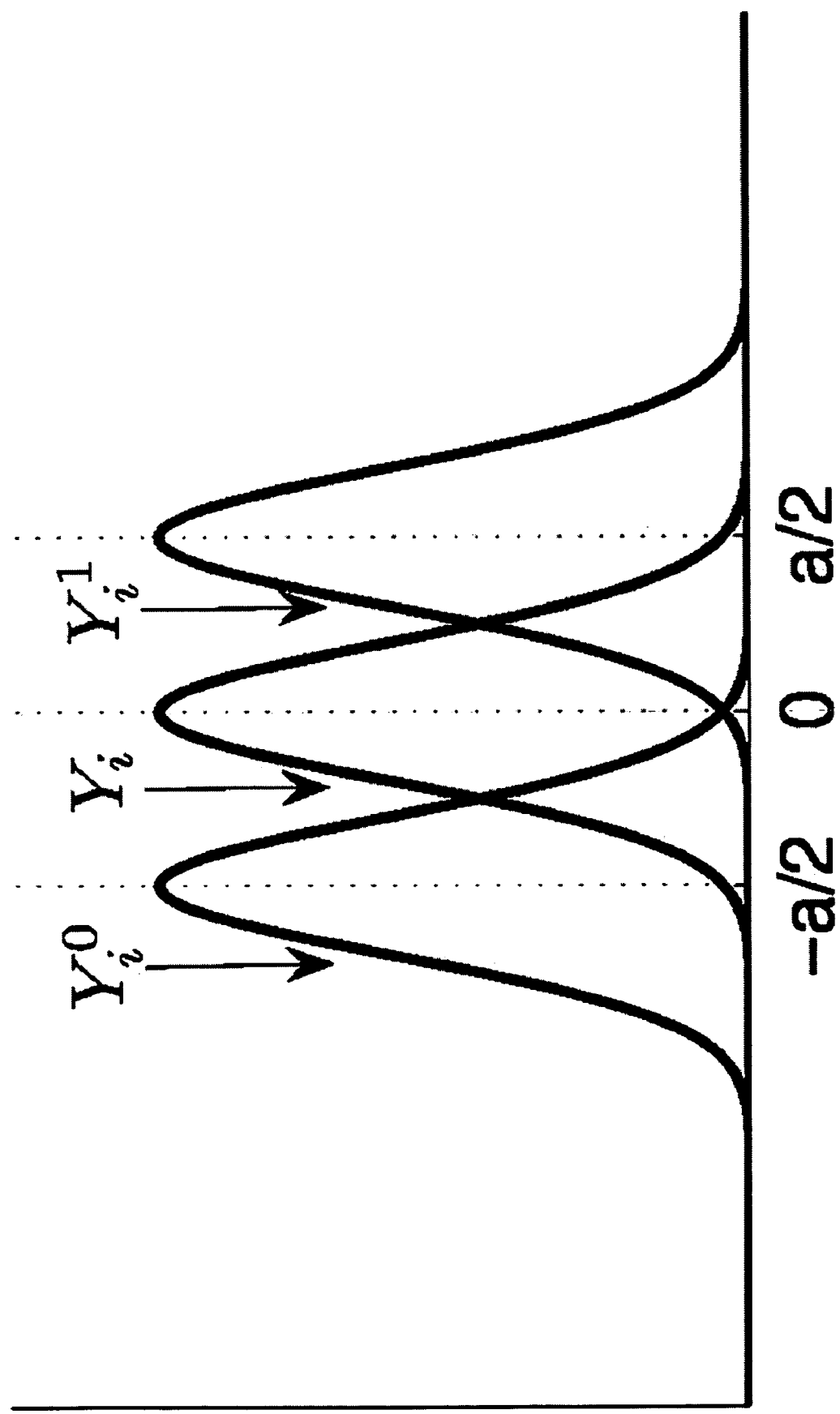
FIG. 8 is a diagram illustrating the effect of watermark encoding over a distribution of $Y_i$ as per an aspect of an embodiment of the present invention.

Therefore, this embodiment of watermark encoding actually shifts the distribution of $Y_i$ to the left or right for a/2, and it makes the resulting distributions of $Y_i^1$ and $Y_i^0$ slightly more clustered than that of $Y_i$. FIG. 8 illustrates the effect of the watermark encoding over distribution of $Y_i$.

Watermark Decoding

To decode the watermark from a flow, each $Y_i$ (i=0, . . . , l−1) may be calculated given the correct decoding offset o, interval size T, and the exact interval grouping and assignment information. If $Y_i$ is greater than 0, the decoding of watermark bit i is 1; otherwise, the decoding is 0.

Therefore, the probability that encoded bit '0' is mistakenly decoded as bit '1' is $Pr[Y_i^0 > 0]$, and the probability that encoded bit '1' is mistakenly decoded as bit '0' is $Pr[Y_i^1 < 0]$.

The upper bound of the decoding error probability may be derived by applying Chebyshev inequality to $Y_i^0$ and $Y_i^1$.

$$Pr\left[|Y_i^1 - E(Y_i^1)| \geq \frac{a}{2}\right] \leq \frac{4\operatorname{Var}(Y_i^1)}{a^2} \leq \frac{T^2 + (T-a)^2}{3a^2 N_i} \quad (13)$$

Since distribution of $$Pr\left[Y_i^1 - \frac{a}{2}\right]$$

is symmetric $$Pr[Y_i^1 < 0] = \frac{1}{2}Pr\left[|Y_i^1 - E(Y_i^1)| \geq \frac{a}{2}\right] \leq \frac{T^2 + (T-a)^2}{6a^2 N_i} \quad (14)$$

Similarly, $$Pr[Y_i^0 > 0] \le \frac{T^2 + (T-a)^2}{6a^2 N_i} \quad (15)$$

Therefore, given any T, 0<a<T, one can minimize the decoding error to arbitrarily low by increasing $N_i$, which can be achieved by increasing the redundancy number r provided that the flow is long enough with sufficient packets.

A Derivation of Distribution of $\Delta t'_{i,j,k}$:

We use X to represent random variable $\Delta t_{i,j,k}$ and use Y to represent random variable $\Delta t'_{i,j,k}$.

Let $r(X) = a + \frac{(T-a)X}{T}$ and $s(Y) = \frac{(Y-1)T}{T-a}$, then Y=r(X) and X=s(Y).

Let f(x) be the p.d.f. of random variable $\Delta t_{i,j,k}$, and g(y) be the p.d.f of random variable $\Delta t'_{i,j,k}$. We have $$f(x) = \frac{1}{T} \text{ for } X \in [0, T).$$

Since both r(X) and s(Y) are continuous, strictly increasing and differentiable, we have $$g(y) = \frac{dG(y)}{dy} \quad (A-1)$$

$$= f[s(y)]\frac{ds(y)}{dy}$$

$$= \frac{1}{T} \times \frac{T}{T-a}$$

$$= \frac{1}{T-a}$$

Therefore, random variable $\Delta t'_{i,j,k}$ is uniformly distributed on range [a, T).

Properties of the Interval Centroid Based Watermarking Scheme

In this section, a few key properties of the interval centroid-based watermarking scheme that are basic to the capability of uniquely identifying a flow, even after significant transformation has occurred are presented and analyzed.

Here, a pseudo random number generator (RNG) and a seed s is used to randomly group and assign each interval to a different watermarking bit. In other words, the random interval grouping and assignment are determined and represented by the RNG and seed s used. Tuple <o, T, RNG, s> represents the complete information needed for the watermarking encoder and decoder to determine the pseudo-random interval grouping and assignment for encoding and decoding the watermark, and it will be shared only between the watermarking encoder and decoder.

Self-Synchronization

Being able to self-synchronize during the decoding process is a feature of the interval centroid based method compared with other watermarking methods. This property enables these watermarking embodiments to uniquely identify flows even after they have been repacketized, merged/mixed with other flows, split into multiple subflows, and perturbed in packet timing.

Given the watermark embedding parameter tuple <o, T, RNG, s>, the decoder should be able to derive the exact random interval grouping and assignment used for encoding the watermark. However, the correct decoding offset not only depends on the value of o but also the clock setting of the decoding host as well as any timing perturbation on the packet timing. When the clock of the watermark decoding host is perfectly synchronized with the clock of the watermark encoding host and there is not packet timing perturbation, offset o will point to the correct decoding start time. When the clocks of the watermark encoding and decoding hosts are not perfectly synchronized, o may point to the wrong decoding start time. In addition, any network delay, network delay jitter, deliberate timing perturbation could shift the correct decoding offset.

Figure 9:
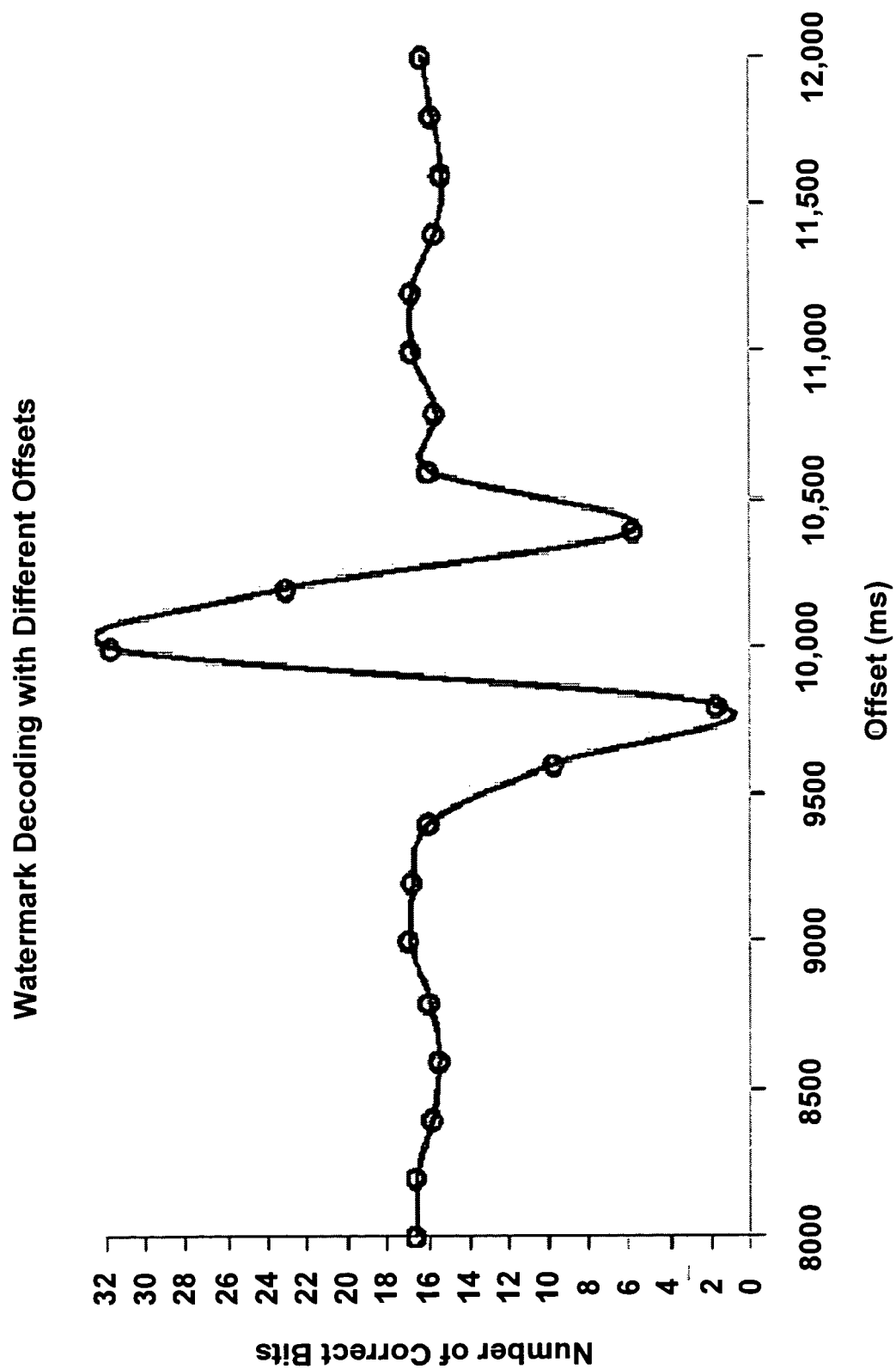
FIG. 9 is a diagram illustrating the offline decoding of a flow that was watermarked with a 32-bit watermark under different offsets as per an aspect of an embodiment of the present invention.

Fortunately, the interval centroid-based watermarking could self-synchronize the decoding offset with the encoding offset even if 1) the clocks of the watermark encoding host and decoding host are not synchronized; 2) there is substantial network delay, delay jitter or timing perturbation on the watermarked flows. Due to the symmetric nature of the random interval grouping and assignment for watermark encoding and decoding, the decoding with wrong offsets appears random and it tends to have 1/2 different bits than the encoded l-bit watermark. This property gives an easy way to determine if the decoding offset used is correct. When decoding from a host without precise clock synchronization with the watermark encoding host, one can simply try a range of different offsets, and the offset that results in the closest match with the watermark is the correct offset for decoding. FIG. 9 shows the offline decoding of a flow that was watermarked with a 32-bit watermark (with 10 second offset) under different offsets, and it clearly shows that only the offset that is very close to the correct one yields the best watermark decoding.

One cost of trying different offsets is that it tends to increase the false-positive rate of the watermark decoding. For example, trying 10 different offsets for decoding, the resulting watermark decoding false-positive rate could be increased to up to 10 times the original false-positive rate. Nevertheless, one can lower the aggregated false-positive rate of the multi-offset decoding sufficiently by lowering the false-positive rate of the single-offset decoding if there are enough packets.

Robustness Against Chaff and Flow Mixing

Robustness against chaff and flow mixing/merging is another property of the interval centroid-based watermarking scheme. In this subsection, the strength of the test embodiments are analyzed by establishing an upper bound on the decoding error probability in the presence of chaff.

Given any packet flow of n packets, any other packets added to or mixed with the original flow as chaff or chaff packets may be considered. Assume there are totally m chaff packets $Pc_1, \ldots, P_{c,m}$ added to packet flow $P_1, \ldots, P_n$, then the resulting flow $P'_1, \ldots, P'_{m+n}$ ($P'_i$ is either $P_j$ or $P_{c,j}$) is a mix of the original flow and the chaff.

Chaff packets as originating from another random packet flow will now be considered. The relative offsets of all chaff packets within their respective intervals are uniformly distributed. Therefore, the chaff added to a watermarked flow tends to shift the centroid within each interval toward the center of the interval, which would weaken the strength of the embedded watermark. In the rest of this subsection, the negative impact of chaff is quantitatively analyzed.

The offsets of the k-th chaff packet added to the j-th group A interval $I_{i,j}^A$ and group B interval $I_{i,j}^B$ are represented by $\Delta \hat{t}_{i,j,k}^A$ and $\Delta \hat{t}_{i,j,k}^B$ respectively. Let $M_{i,j}^A$ and $M_{i,j}^B$ be the number of chaff packets added to interval $I_{i,j}^A$ and $I_{i,j}^B$, respectively. The $$M_i^A = \sum_{j=0}^{r-1} M_{i,j}^A$$

and $$M_i^B = \sum_{j=0}^{r-1} M_{i,j}^B$$

are the total number of chaff packets added to those r group A intervals $I_{i,j}^A$ and r group B intervals $I_{i,j}^B$, respectively, assigned for watermark bit i.

The statistical characteristics of the offsets of the chaff packets within their intervals are considered first. Let $$C_i^A = \frac{\sum_{j=0}^{r-1} \sum_{k=0}^{M_{i,j}^A-1} \Delta \hat{t}_{i,j,k}^A}{M_i^A} \quad (16)$$

and $$C_i^B = \frac{\sum_{j=0}^{r-1} \sum_{k=0}^{M_{i,j}^B-1} \Delta \hat{t}_{i,j,k}^B}{M_i^B} \quad (17)$$

The impact of the chaff packets over the watermark detection error probability $Pr[Y_i^0 > 0]$ and $Pr[Y_i^1 < 0]$ is now considered. Let $\hat{Y}_i^0$ and $\hat{Y}_i^1$ be the random variables that denote the resulting values of $Y_i^0$ and $Y_i^1$, respectively, after chaff has been added. Then the probability that bit '1' is mistakenly decoded as bit '0' is $Pr[\hat{Y}_i^1 < 0]$, and the probability that bit '0' is mistakenly decoded as bit '1' is $Pr[\hat{Y}_i^1 > 0]$. By applying the Chebyshev inequality to $\hat{Y}_i^0$ and $\hat{Y}_i^1$, the following upper bounds on the decoding error probabilities may be established (the detailed derivation are omitted due to space limitation):

$$Pr[\hat{Y}_i^0 > 0] = Pr[\hat{Y}_i^0 - E(\hat{Y}_i^0) > -E(\hat{Y}_i^0)] \quad (18)$$
$$= \frac{1}{2} Pr[|\hat{Y}_i^0 - E(\hat{Y}_i^0)| \geq -E(\hat{Y}_i^0)] \leq \frac{\text{Var}(\hat{Y}_i^0)}{2(E(\hat{Y}_i^0))^2}$$
$$= \frac{(1+R_B)^2 T^2}{3a^2 N_i (1+R)}$$

$$Pr[\hat{Y}_i^1 < 0] \leq \frac{\text{Var}(\hat{Y}_i^1)}{2(E(\hat{Y}_i^1))^2} = \frac{(1+R_A)^2 T^2}{3a^2 N_i (1+R)} \quad (19)$$

Here, $$R_A = \frac{M_i^A}{N_i^A}, R_B = \frac{M_i^B}{N_i^B}, R = \frac{M_i}{N_i},$$

represent the ratios between the number of chaff packets and the number of original packets. By the law of large numbers, $R_A \approx R_B \approx R$ when $N_i$ is large. Equations 18 and 19 show that the larger the $R_A$, $R_B$, R, the higher the decoding error probabilities. This result confirms intuition: the more chaff, the more errors the decoding tends to have. However, no matter how large the $R_A$, $R_B$, R, (as long as they are finite), one can always make the decoding error probabilities arbitrarily close to zero by having sufficiently large $N_i$. From equation 5, one can make $N_i$ sufficiently large by having sufficiently large $n_p$ provided the flow is sufficiently long and there are enough packets. The important result here is that the interval centroid based watermarking scheme can achieve asymptotic error free decoding even if the number of chaff packets added is many times more than the number of original packets, provided the original flow is long enough and has enough packets. This result holds true regardless of the distribution of chaff added and it counters the claims by Blum et al. [5].

Robustness Against Packet Dropping, Repacketization, and Flow Splitting

Packet dropping, merging adjacent packets, and splitting flows into multiple subflows may decrease the number of packets in the original flow. This effect can be summarize as de-chaff. Since flow duration is randomly divided into multiple intervals and those intervals are randomly grouped for each watermark bit, any packet lost should be uniformly distributed within each interval $I_{i,j}^A$ and $I_{i,j}^B$. Therefore, when there are enough packets left in the flow, the centroids of all the intervals tend to remain the same even after the packets have been randomly dropped and merged. This property would allow the embedded watermark to persist even after random packet dropping, merging, or flow splitting.

Figure 16:
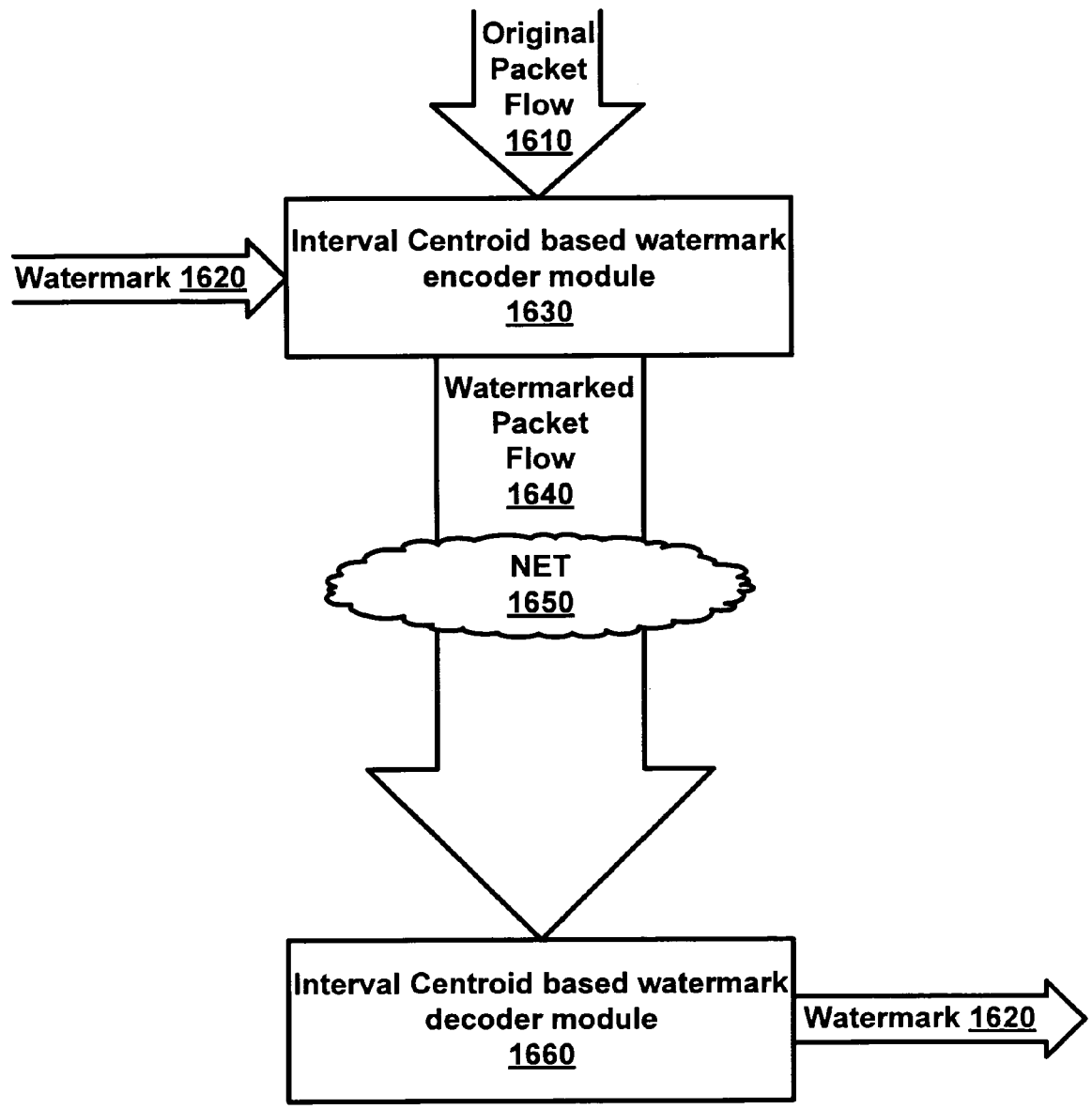
FIG. 16 is a block diagram of a system to watermark a packet flow with an interval centroid based watermark as per an aspect of an embodiment of the present invention.

FIG. 16 is a block diagram of a system as per an aspect of an embodiment of the present invention. A shown, an original packet flow 1610 is received by an interval centroid based watermark encoder module 1630. The interval centroid based watermark encoder module 1630 applies a watermark 1620 to the original packet flow 1610 yielding a watermarked packet flow 1640. This packet flow may travel through one or more networks 1650 to a destination. The destination may use an interval centroid based watermark decoder module 1660 to retrieve the watermark 1620.

Figure 17:
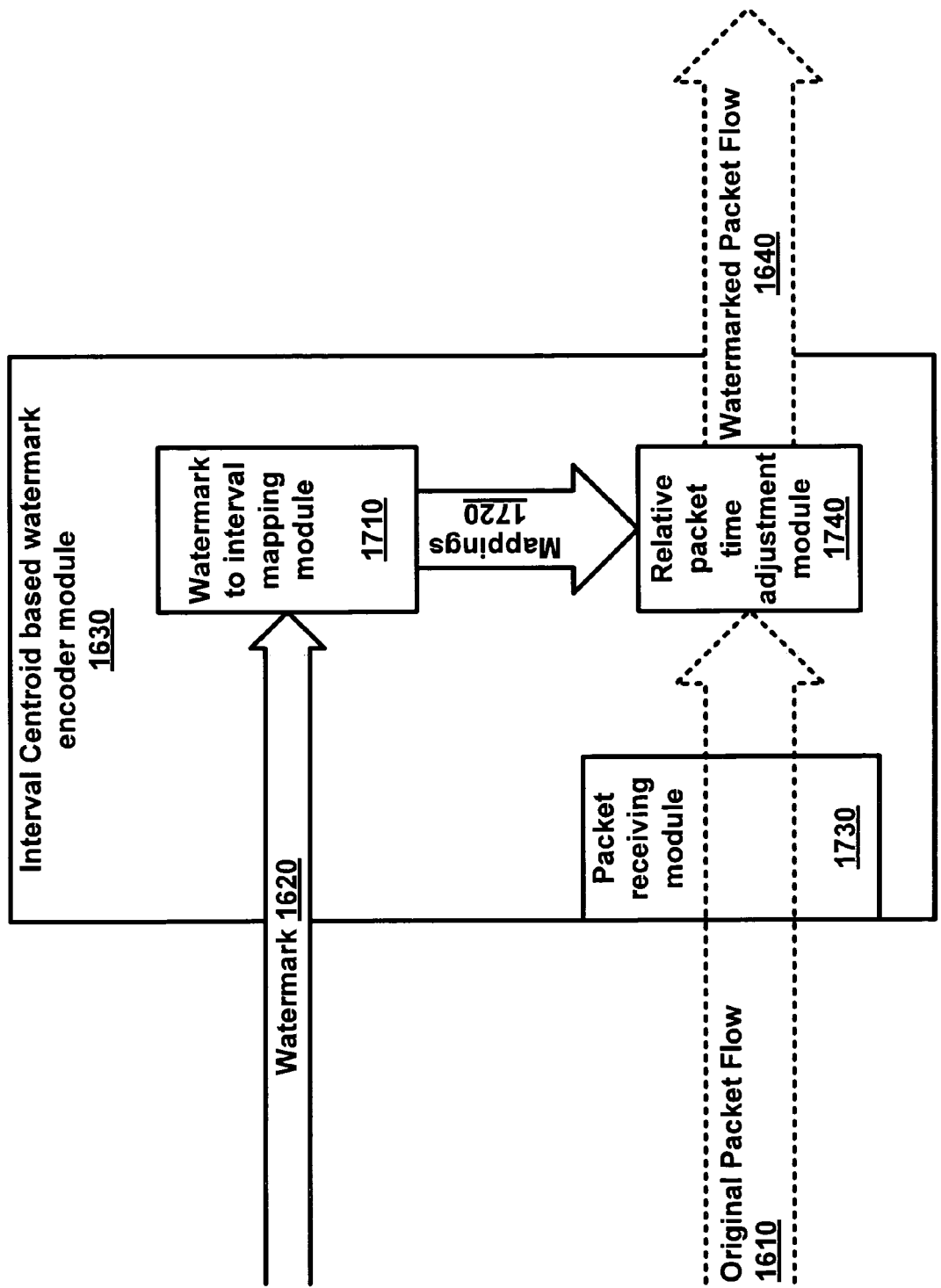
FIG. 17 is a block diagram of an interval centroid based watermark encoder module as per an aspect of an embodiment of the present invention.

FIG. 17 is an expanded block diagram of an embodiment of the interval centroid based watermark encoder module 1630 shown in FIG. 16. The interval centroid based watermark encoder module 1630 may include a packet receiving module 1730, a watermark to interval mapping module 1710, and a relative packet time adjustment module 1740. The packet receiving module 1610 may be configured to receive the original packet flow 1610. The original packet flow 1610 may be a part of a larger packet flow. This original packet flow 1610 should have a temporal duration 1860 and a starting point 1850.

Figure 18:
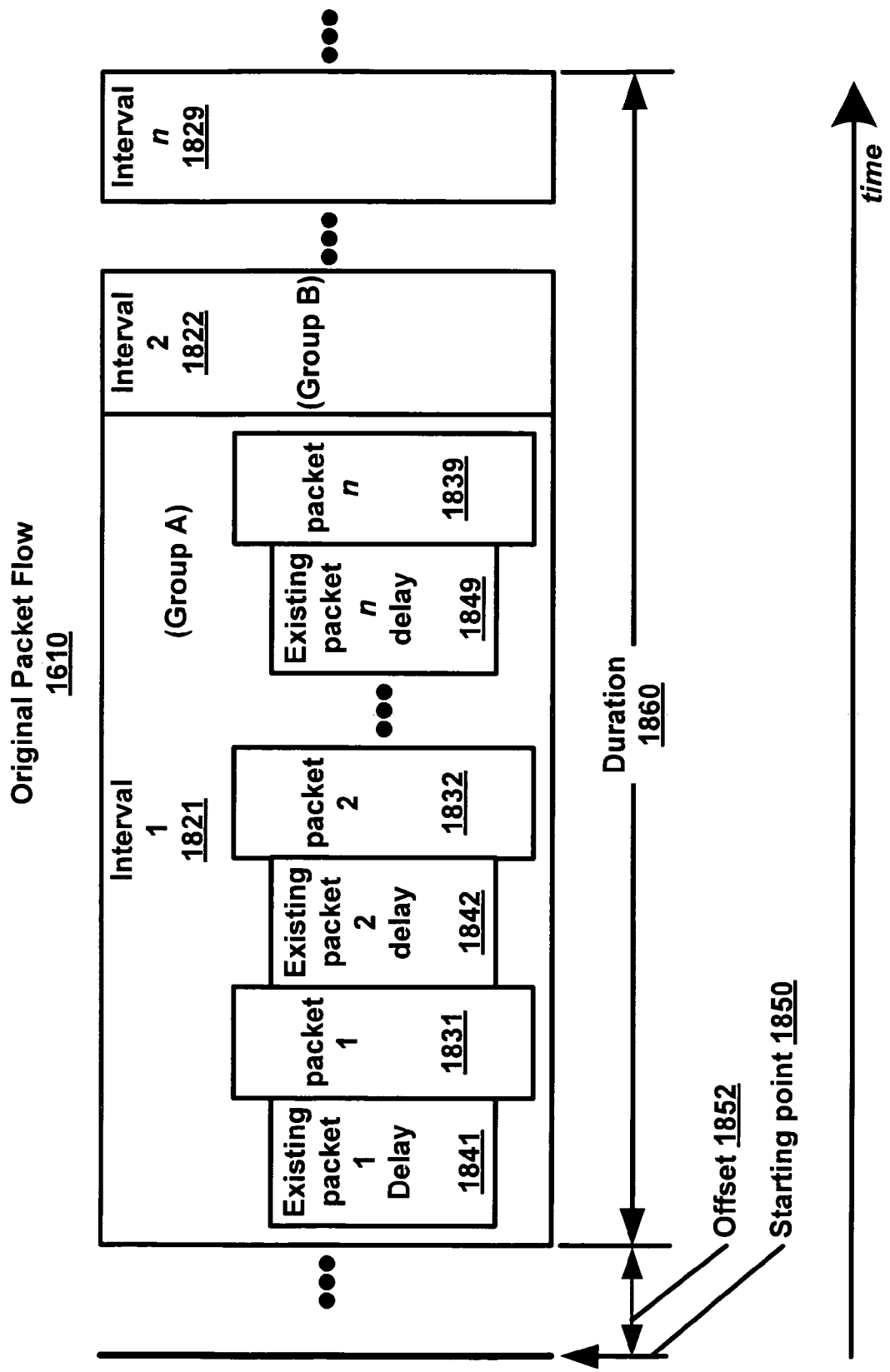
FIG. 18 is a block diagram showing aspects of an original packet flow as per an aspect of an embodiment of the present invention.

FIG. 18 is a block diagram of an original packet flow 1610. The packet flow containing a temporally separated sequence of packets (1831, 1832, 1839) separated by existing inter-packet delays (1841, 1842 and 1849). At least part of the packet flow 610 may be separated into a temporally separated sequence of intervals (1821, 1822 and 1829). In a previously described embodiment, the interval times were equal. However, one skilled in the art will recognize that that unequal intervals could also be used. The temporally separated sequence of intervals (1821, 1822 and 1829) may begin after an offset 1852 from the starting point 1850. The offset could be any measurable length of time less that is less than the duration minus the sum of the interval times. In some embodiments, the offset could be zero. At least one of the temporally separated sequence of intervals (1821, 1822 and 1829) may be a group A interval (2022, shown in FIG. 20). At least one other of the temporally separated sequence of intervals (1821, 1822 and 1829) may be a group B interval (2024, shown in FIG. 20).

The watermark to interval mapping module 1710 may be configured to map watermark bits to unique pair(s) of intervals. The unique pair(s) of intervals should include a unique group A interval 2021 and a unique group B interval 2024. Each of the watermark bits may represent a bit value.

The relative packet time adjustment module 1740 may be configured to embed watermark bit(s) into mapped intervals by modifying the relative time between the temporally separated sequence of packets in an interval and the beginning of the same interval. So, for the illustrative example, the relative packet time adjustment module 1740 may increase the relative time 1981 between the temporally separated sequence of packets (1831, 1832, 1839) in unique group A interval 1821 that is mapped to each of the watermark bit(s) that represents a first bit value and the beginning of the same each unique group A interval 1821. If the bit represents a second value, the relative packet time adjustment module 1740 may increase the relative time between the temporally separated sequence of packets in unique group B interval 1822 and the beginning of the same unique group B interval 1822. The first and second values may represent binary values such as '0' and '1'. However, one skilled in the art will recognize that other values may also be represented. For example, the relative packet times may be increased by different values to help embed a trinary or higher value.

Figure 19:
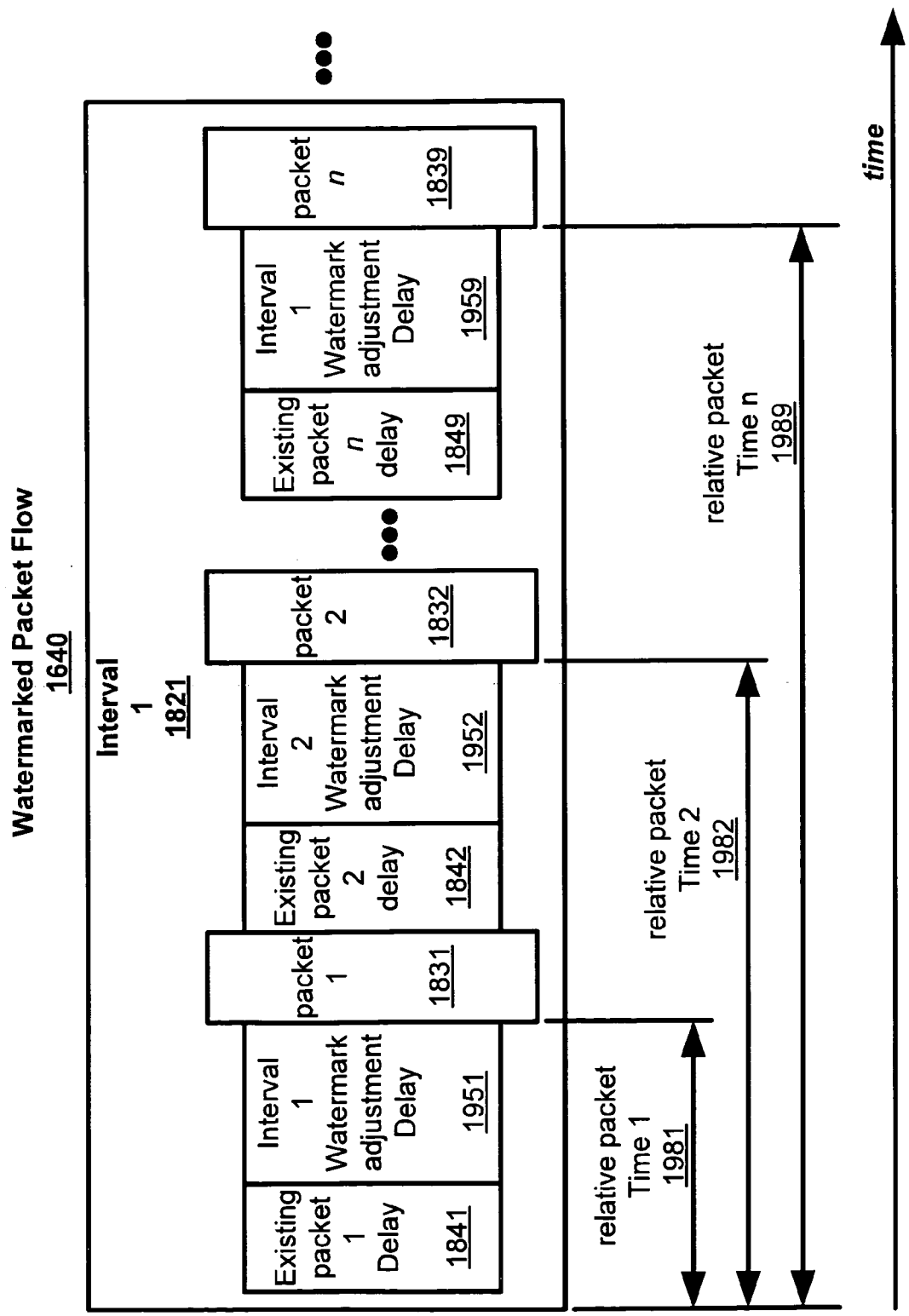
FIG. 19 is a block diagram of a watermarked packet flow as per an aspect of an embodiment of the present invention.

FIG. 19 is block diagram of a resultant group A watermarked interval 1821 representing a first bit value in watermarked packet flow 1640. This watermarked interval 1821 is similar to the original packet flow 1610 with the addition of the interval watermark adjustment delays (1951, 1952 an 1959). Each of these interval watermark adjustment delays (1951, 1952 an 1959) are introduced to increase the relative packet times 1981, 1982, and 1989). In this scenario, the group B interval that is paired with this group A interval 1821 would not have extended adjustment delays. Alternatively, if the interval pair were to represent a second bit value, then the group B interval watermark adjustment delays would be extended instead of the group A interval watermark adjustment delays (1951, 1952 an 1959).

Because the interval centroid based watermark encoder module 1630 embeds data using timing delays, it does not care about the content of the data. Therefore, this encoder could be used with encrypted, compressed or in-the-clear packets.

Figure 20:
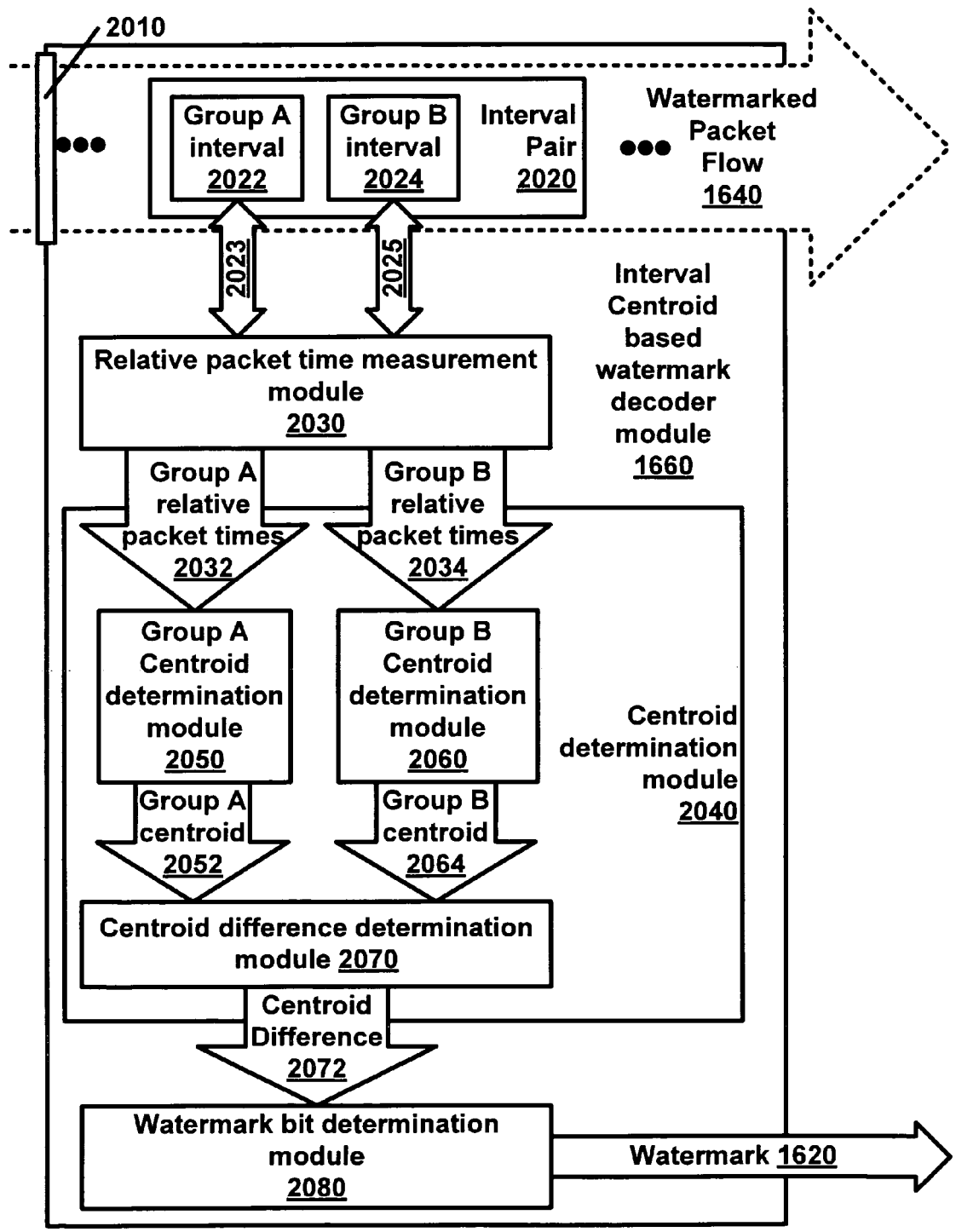
FIG. 20 is a block diagram of an interval centroid based watermark decoder module as per an aspect of an embodiment of the present invention.

FIG. 20 is a block diagram of an interval centroid based watermark decoder 1660 as per an aspect of an embodiment of the present invention. As shown, the interval centroid based watermark decoder 1660 includes a watermarked packet receiving module 2010, a centroid determination module 2040 and a watermark bit determination module 2080.

The watermarked packet receiving module 2010 may be configured to receive watermarked packet flow 1640. The watermarked packet flow 1640 may have a duration 1860 and a starting point 1850 and contain a temporally separated sequence of packets (1831, 1832 and 1839). At least part of the watermarked packet flow 1821 may be divided into a temporally separated sequence of intervals (1821, 1822 and 1829) that begin after an offset 1852 from the starting point 1850. At least one of the temporally separated sequence of intervals (1821, 1822 and 1829) may be a group A interval (e.g. 1821) and at least one other of the temporally separated sequence of intervals may be a group B interval (e.g. 1822). Each of at least one bit of a watermark may be mapped to at least one unique pair of intervals, where each of the unique pair of intervals includes a unique group A interval and a unique group B interval.

The relative packet time measurement module 2030 may be configured to measure: group A relative packet times and group B relative packet times. The group A relative packet times (see e.g. 1981, 1982 and 1989) my be the relative time between the temporally separated sequence of packets in each unique group A interval and the beginning of each unique group A interval. Similarly, group B relative packet times may be the relative time between the temporally separated sequence of packets in each unique group B interval and the beginning of each unique group B interval.

For each unique pair of intervals, the centroid determination module 2040 may be configured to calculate a group A centroid 2052 using group A relative packet times 2032 and a group B centroid 2064 using the group B relative packet times 2034. The group A centroid calculation may be performed by a group A centroid module 2050. Likewise, the group B centroid calculation may be performed by a group B centroid module 2060. However, one skilled in the art will recognize that these functions may also be integrated and combined with each other or other modules as needed to satisfy specific implementation needs and/or requirements. A centroid difference 2072 may be calculated by centroid to difference module 2070 using the group A centroid 2052 and the group B centroid 2064.

Watermark bit determination module 2080 may be configured to analyze the centroid difference(s) 2072 to determine watermark bit value(s). For example, the watermark bit determination module 2080 may be configured to determine that a watermark bit mapped to unique pair(s) of intervals represents a first bit value if the centroid difference 2072 for the unique pair(s) of intervals is greater than a first threshold. Similarly, the watermark bit determination module 2080 may be configured to determine that the watermark bit mapped to unique pair(s) of intervals represents a second bit value if the centroid difference 2072 for unique pair(s) of intervals is less than a second threshold. It may also be that the watermark bit determination module 2080 may be configured to evaluate the centroid difference 2072 using one or more other criterions to determine a bit value represented by watermark bit(s) mapped to pair(s) of intervals. The bit value need not be constrained to two values in all embodiments.

Figure 21:
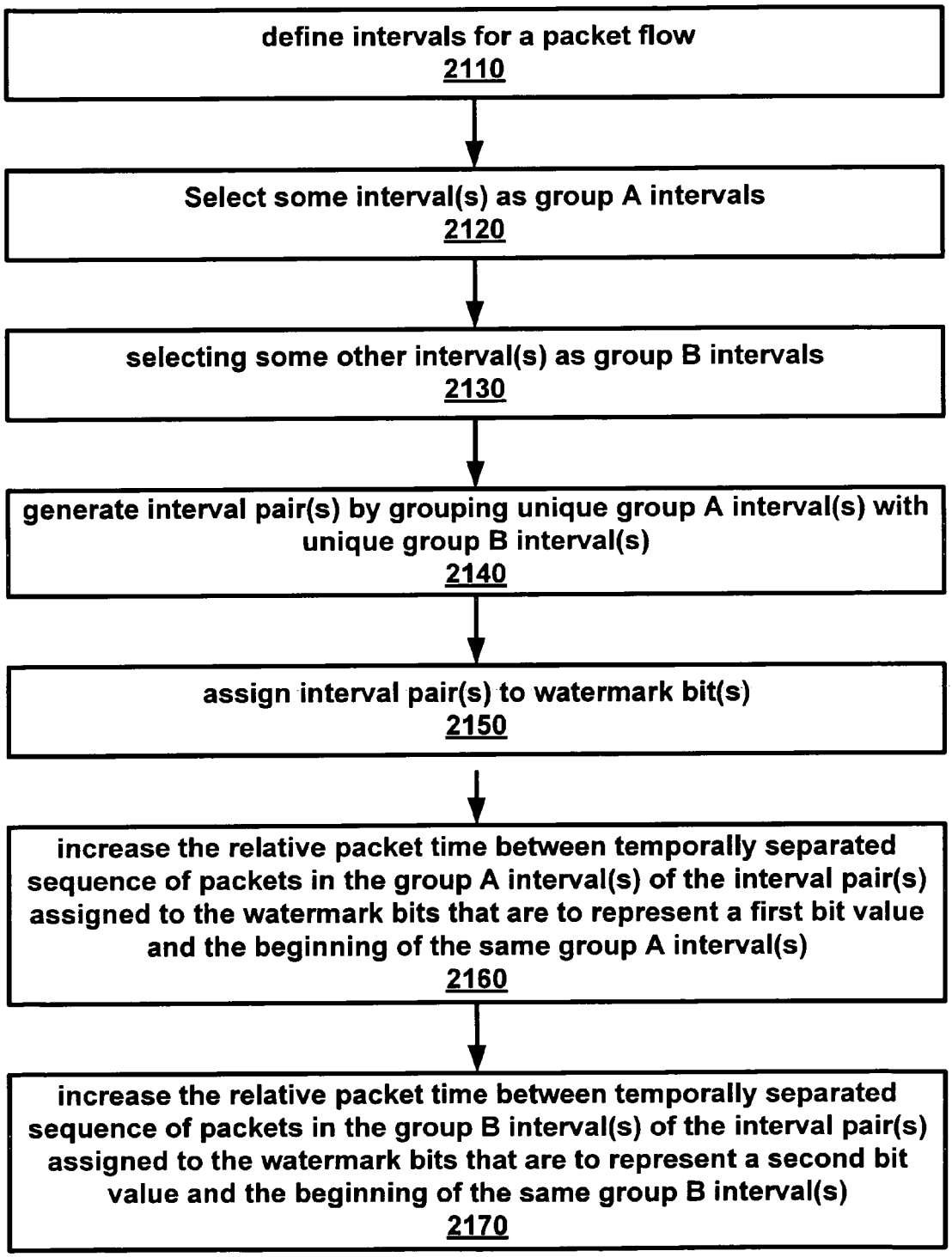
FIG. 21 is a flow diagram of interval centroid based watermark encoding as per an aspect of an embodiment of the present invention.
Figure 22:
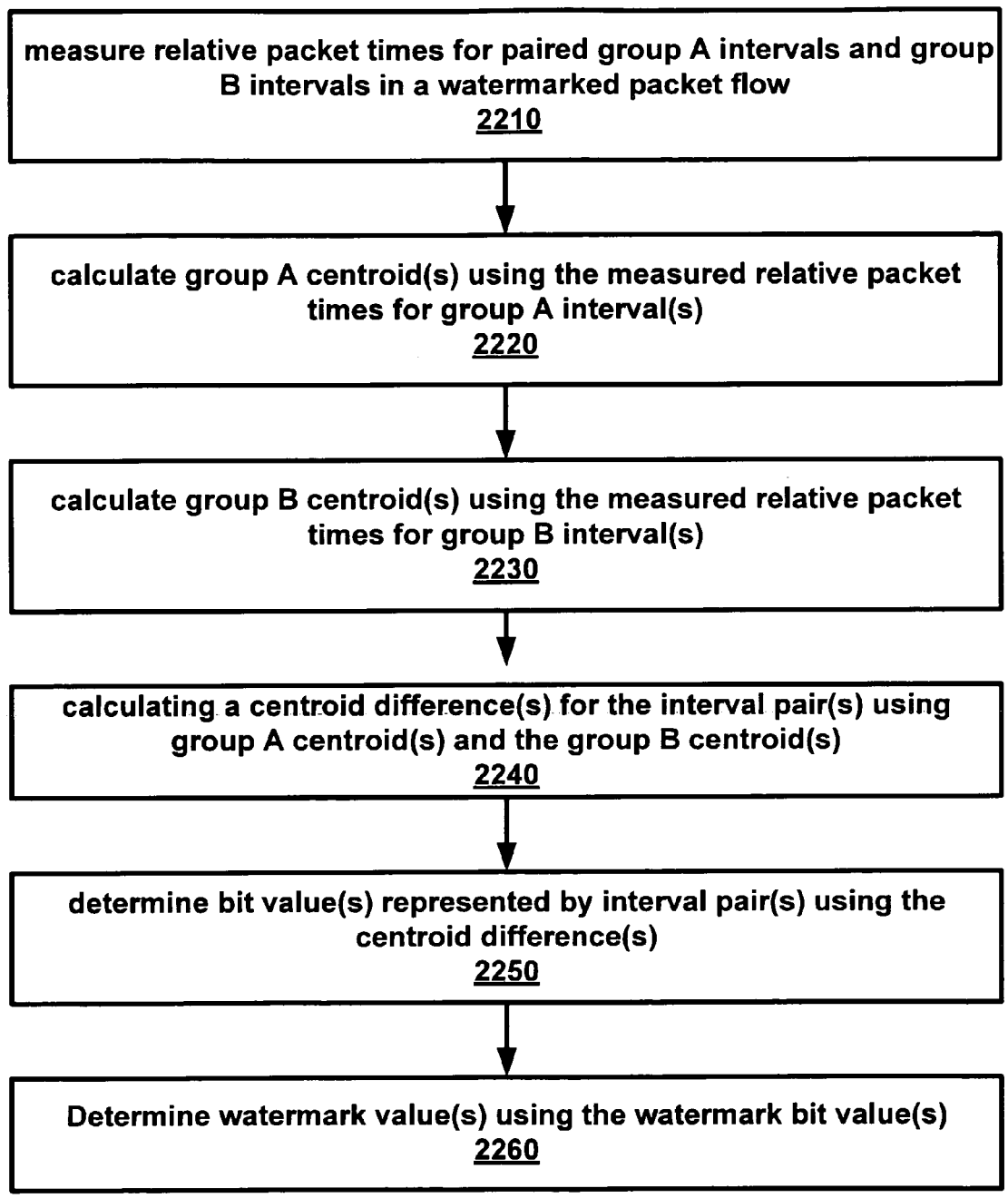
FIG. 22 is a flow diagram of interval centroid based watermark decoding as per an aspect of an embodiment of the present invention.

Some embodiments of the present invention may be a computer-readable media tangibly embodying a program of instructions executable by a computer to perform a method for applying an interval centroid based watermark to a packet flow intended to travel through a physical network. FIG. 21 shows a flow diagram of a possible embodiment of such a method. The method may operate on a packet flow that contains a temporally separated sequence of packets. The packet flow will preferably have a duration $T_f$ and a starting point. The watermark may have l watermark bits and a redundancy r, where each of the l watermark bits are representative of a value. The watermark bit values may be one of two or more values.

At 2110, a quantity of 2n intervals may be defined where n is the product of length l and redundancy value r. The intervals divide a duration Td that is less than or equal to duration Tf. The 2n intervals may begin after an offset from the starting point. At 2120, n intervals may be selected as group A intervals. This selection process may be non-deterministic (such as a random selection) or deterministic. Examples of non-deterministic selection mechanisms may include random or pseudo random selection. Examples of deterministic selection mechanisms may include using a look-up table or defined algorithm to make selections. At 2120, n intervals that are distinct from the group A intervals maybe selected as group B intervals.

At 2140, n interval pairs may be generated by grouping n unique group A intervals with n unique group B intervals. A quantity of the r interval pairs may be assigned to each of the l watermark bits. Making r greater than one increases the redundancy of the watermark and thus should increase the probability of the watermark being recovered properly by a later decoding stage.

Watermark bit(s) with a first watermark bit value may encoded into the packet stream by increasing the relative packet time between each of the temporally separated sequence of packets in the group A intervals of the n interval pairs assigned to each of the l watermark bits that are to represent the first bit value and the beginning of the same group A intervals at 2161. Similarly, at 2170, watermark bit(s) with a second watermark bit value may encoded into the packet stream by increasing the relative packet time between each of the temporally separated sequence of packets in the group B intervals of the n interval pairs assigned to each of the l watermark bits that are to represent the second bit value and the beginning of the same group B intervals.

FIG. 21 shows a flow diagram of a method that may be embodied on a computer-readable media tangibly as a program of instructions executable by a computer to perform a method for decoding the interval centroid based watermark from the watermarked packet flow encoded using a method like that disclosed in FIG. 21 and earlier. At 2210, relative packet times may be measured for the temporally separated sequence of packets in the n group A and n group B intervals. A group A centroid for each of the quantity of n group A intervals may be calculated using the relative packet times measured in each of the quantity of n group A intervals at 2220. Similarly, a group B centroid may be calculated for each of the quantity of n group B intervals using the relative packet times measured in each of the quantity of n group B intervals at 2230.

A centroid difference may be calculated for the interval pairs of group A intervals and group B intervals at 2240 using the group A centroid and the group B centroid. Watermark bit values represented by the n interval pairs may be determined at 2250. It may be determined that an interval pair represents a first watermark bit value if the centroid difference calculated for that interval pair is greater than a first threshold. Similarly, it may be determined that an interval pair represents a second watermark bit value if the centroid difference calculated for that interval pair is less than a second threshold. At 2260, a value for the maybe determined watermark using the watermark bit values represented by the n interval pairs.

Embodiments of the present invention may be used in systems that desire a covert channel to pass information. Embodiments of such systems are shown in FIG. 23, FIG. 24, FIG. 25 and FIG. 26. These illustrative systems use the previously disclosed embodiments to provide a covert channel that may be used to hide data such as server/customer authentication information in an IP packet stream without modifying any of the IP packets. In these systems, the hidden data may be hidden in the packet stream as a watermark. Examples of applications that can use systems like these include: secure verification of communication partners; secret peer-to-peer communications; tracking network devices; and tracing communications.

Figure 23:
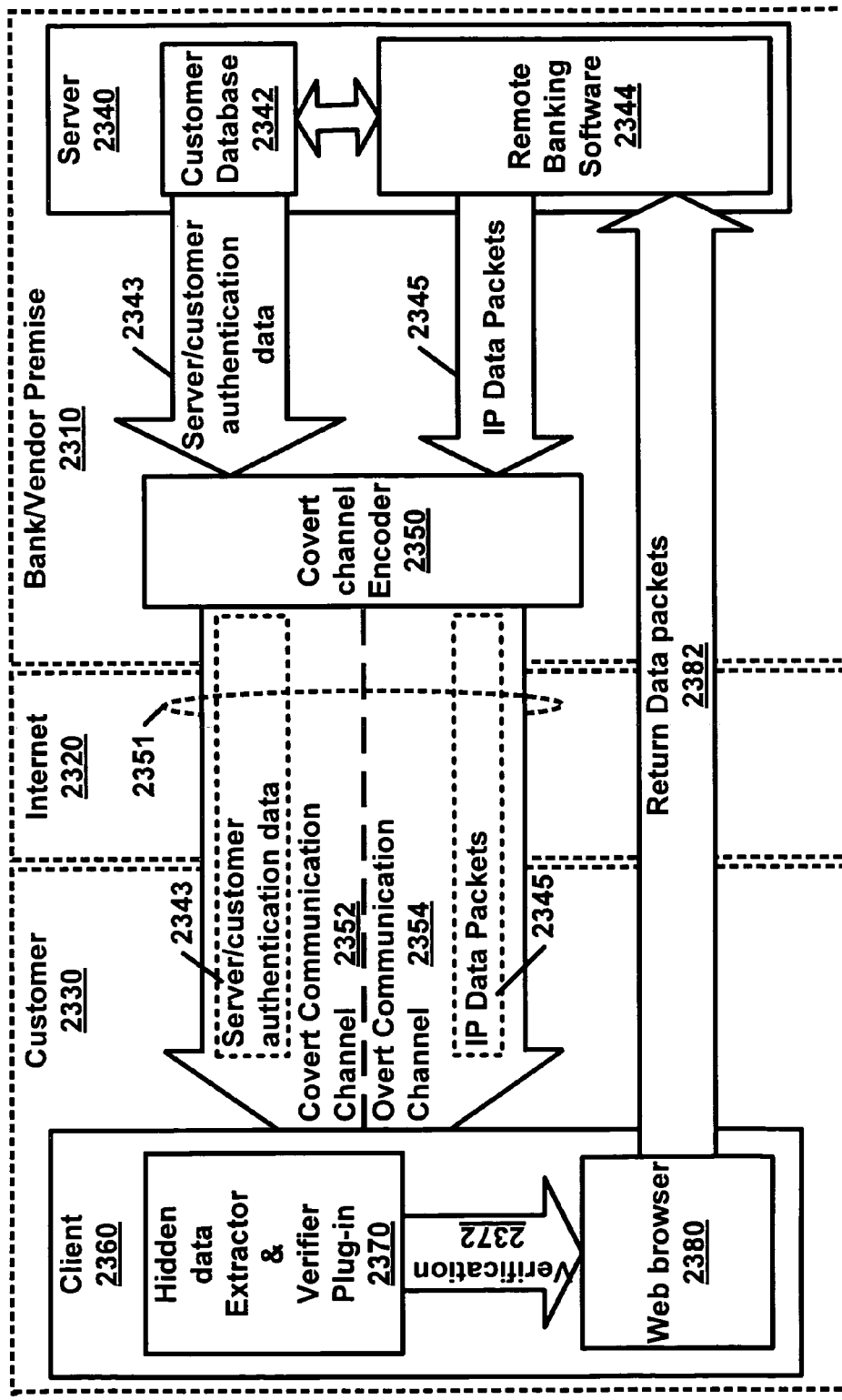
FIG. 23 is a block diagram of a unidirectional verification system using embodiments of the present invention.
Figure 24:
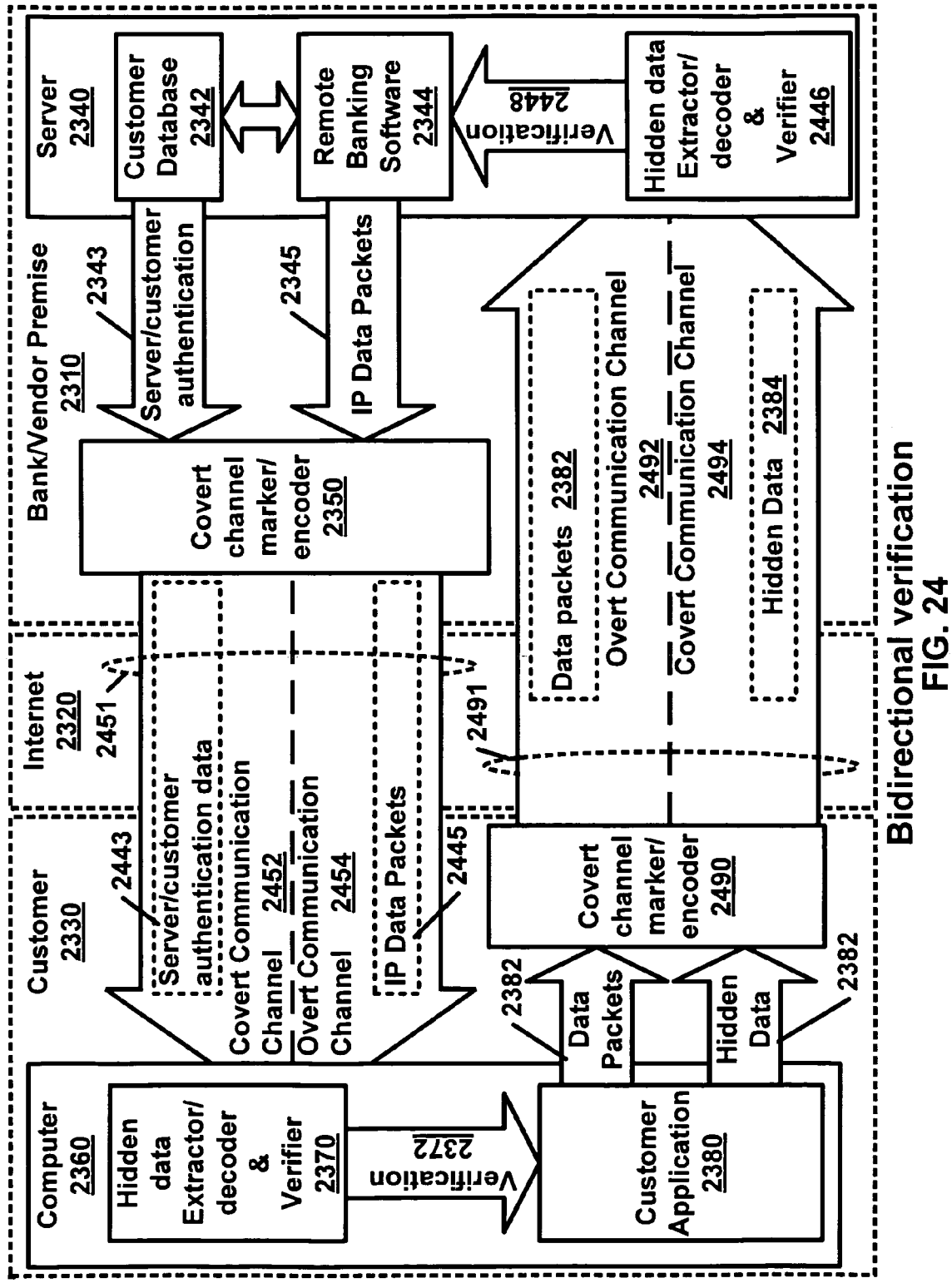
FIG. 24 is a block diagram of a bidirectional verification system using embodiments of the present invention.

Each of these applications may be implemented using two common components: a hidden data inserter/encoder module and a hidden data extractor/decoder module. The hidden data inserter/encoder module may be implemented using a watermark encoder and the hidden data extractor may be implemented using a watermark decoder. FIG. 23 and FIG. 24 show two implementations of a server verification mechanism.

FIG. 23 shows a unidirectional system configured to allow a customer 2330 receive authentication information in a secure manner from a vendor 2310 such as a bank using a generic client side computer 2360 running a web browser 2380. A server application 2344 such as remote banking software and web browser 2380 may communicate in their usual way with the server application 2344 passing outgoing data packets 2345 to the web browser 2380 and the web browser 2380 passing return data packets 2382 back to the server application 2344. However, the server 2340 can add unique customer information 2343 (possibly obtained using a customer database 2342) to the data stream 2345 using a hidden channel marker/encoder module 2350. This hidden channel marker/encoder module 2350 may be internal or external to the server 2340. This combined stream 2351 may now consist of a covert communication channel 2352 and an overt communication channel 2354. The covert communication channel 2352 may carry the server/customer authentication data and an overt communication channel 2354 may carry the normal IP data packets from the server application 2344. This combined communications channel 2351 may be transported to a customers computer 2360 through a network 2320 such as the Internet where a hidden data extractor/decoder and verifier module 2370 may extract the unique customer information, verifies it and passes the verification data 2372 to the customers' web browser effectively informing the customer that they are in fact communicating with the vendor server 2340 and not a site pretending to be the vendor server 2340. In some embodiments the hidden data extractor/decoder and verifier module 2370 may also pass other hidden data besides just verification data to the web browser 2380.

FIG. 24 is similar to FIG. 23 with the addition on a return channel 2491 with a secure component 2494 making it a bidirectional system configured to allow a customer 2330 and server 2340 to authenticate each other using a bidirectional hidden channels 2352 and 2494. In addition to the features of the system illustrated in FIG. 23, the customer computer 2360 may now run a customer application 2380 that returns a combined communications stream 2491 to the server 2340 that includes hidden data 2382 with its normal return data packets 2382. The hidden data 2382 may be encoded into the covert communications channel 2494 that resides in the timing of the overt communications channel 2492 by covert channel marker/encoder module 2490. The server 2340 may now use a hidden data extractor/decoder and verifier module 2446 to extract the hidden data 2382. This hidden data may be verified by hidden data extractor/decoder and verifier module 2446. The verification 2448 and/or hidden data 2382 may be passed to the server application 2344.

In the two examples illustrated in FIG. 23 and FIG. 24, the remote server 2340 ran a banking software application 2344 that using the covert channel marker/encoder module 2350 and covert channel marker/encoder module 2490 (in FIG. 24) to add an invisible layer of security and/or authentication. However, one skilled in the art will recognize that this mechanism may be used with many other applications than just banking. For example, this mechanism may be used to pass secure messages between interested parties, or used to pass secrets such as encryption keys that may be used in combination with other security mechanism.

Figure 25:
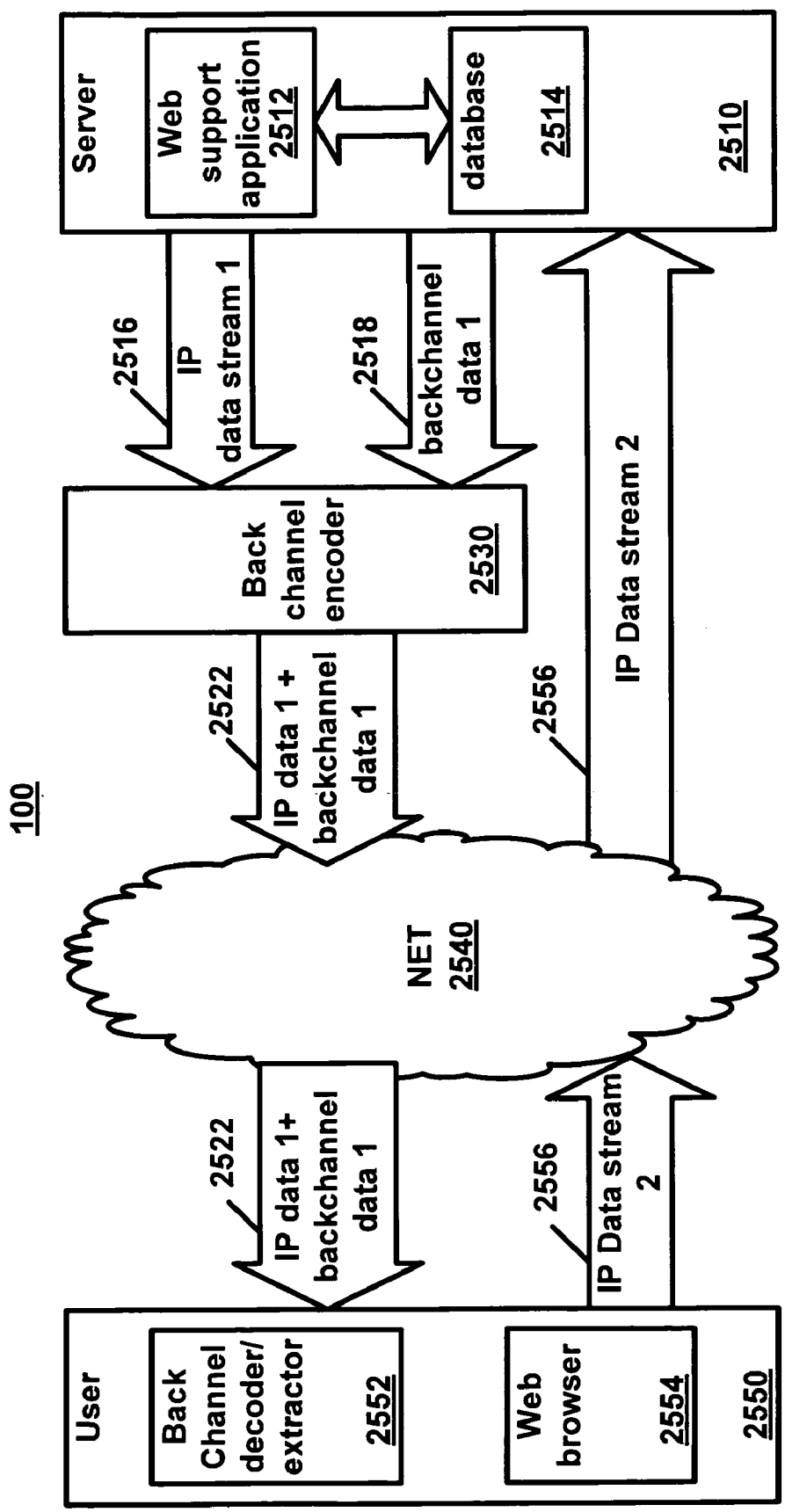
FIG. 25 is a block diagram of a unidirectional verification system using embodiments of the present invention.

FIG. 25 shows a unidirectional backchannel between a server 2510 and a user 2550. As shown, a web support application 2512 in combination with an optional database provide a back channel marker encoder module 2530 with a normal IP packet stream 2516 and backchannel data 2518 to a backchannel marker/encoder module 2530. Backchannel marker/encoder module 2530 may encode the backchannel data 2518 into the timing of IP packet stream 2516 to produce combined stream 2522. This mechanism is effectively watermarking the IP packet stream 2516 with the backchannel data 2518. This combined (watermarked) stream 2522 may be communicated over a network 2540 to a user 2550. The network may be an open network such as the Internet or a closed network such as a corporate intra-net. The user may use a back channel extractor/decoder module 2552 to retrieve the backchannel data 2518. The back channel extractor/decoder module 2552 may be embodied in software or hardware. Software embodiments may be implemented as a stand alone program, as a applet or as a browser plug-in for a web browser 2554. The user 2550 may then provide a normal return data stream 2556 to the server 2510. This system should enable data to be hidden data such that it is undetectable by analysis of packet data alone.

Figure 26:
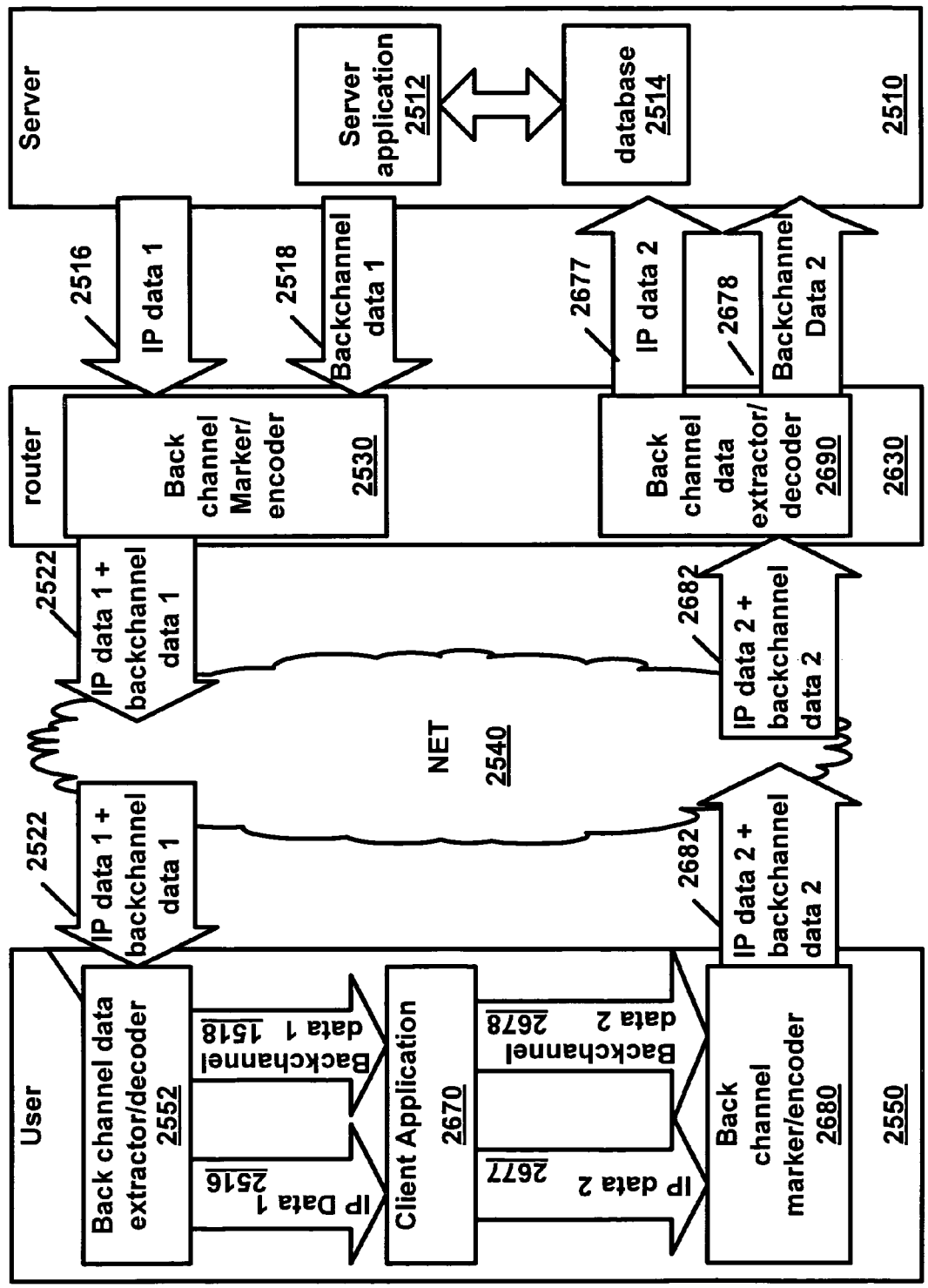
FIG. 26 is a block diagram of a bidirectional verification system using embodiments of the present invention.

FIG. 26 shows an extended version of the system in FIG. 25. The first difference to notice is that the back channel marker/encoder module 2530 is embedded in a router 2630 along with a back channel data extractor/decoder module 2690. This was illustrated this way to show that one of the multiple sites in which modules such as the back channel marker/encoder module 2530 or back channel data extractor/decoder module 2690 could be located. Locating these modules in a communication path may allow the modules to mark and extract hidden data from a larger number of communications that may originate from a larger number of sources.

A second variation is the substitution of a client application 2670 for the more generic web browser application 2554. Again, this is to demonstrate the many ways that the system can system can operate. As illustrated in this example, the client application may generate a return IP data stream 2677 and backchannel data 2678. The backchannel marker/encoder module 2680 may encode the backchannel data 2678 into the timing of IP packet stream 2677 to produce combined stream 2682. Data stream 2682 may be communicated through a network 2640 to a device such as back channel data extractor/decoder 2690. Back channel data extractor/decoder 2690 may then extract the backchannel data 2678 from the IP data stream 2677. The backchannel data 2678 and/or the IP data stream 2677 may then be provided to the server or other destination.

It is anticipated that this technology not be limited to a server and user. For example, the system could mark and extract data from any point in a communications chain. It could be used between peers or merely inserted at a convenient tap location such as in a network card, a router, etc.

Experiments
Real-Time Experiments on Live Anonymized Web Traffic
Real-time penetration experiments were conducted on the Total Net Shield service provided by leading anonymizing service provider www.anonymizer.com. According to www.anonymizer.com, the Total Net Shield is their "ultimate solution in online identity protection". This makes it an attractive candidate for examining the effectiveness of our flow watermarking technique in identifying transformed network flows.

Figure 10:
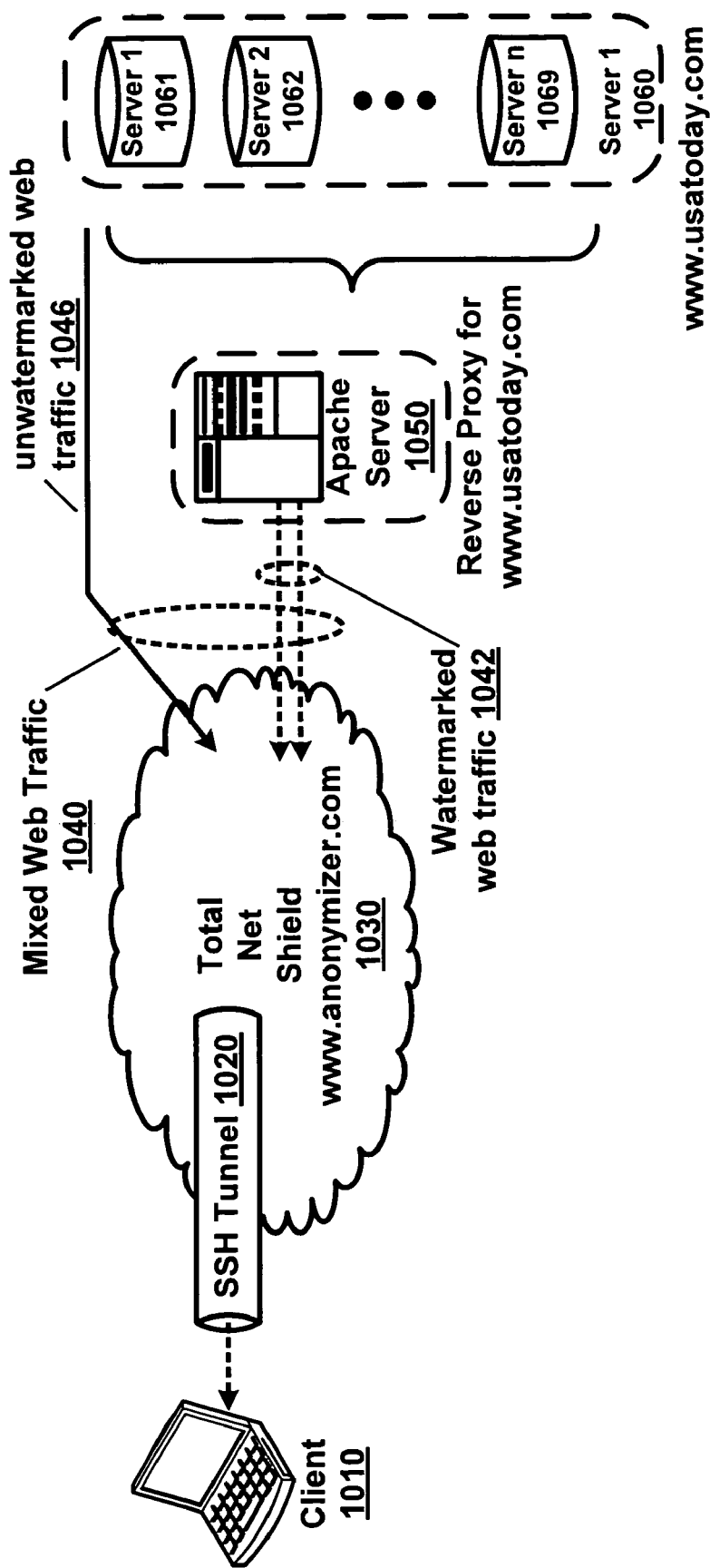
FIG. 10 is a diagram illustrating a setup used to conduct real-time experiments using an aspect of an embodiment of the present invention.

FIG. 10 illustrates the setup of the real-time experiments. Live Web traffic from www.usatoday.com was watermarked and to see if a watermark applied by a test embodiment could penetrate the Total Net Shield service provided by www.anonymizer.com. An Apache server 1050 was set up as a reverse proxy to www.usatoday.com 1060 so that all the Web pages of www.usatoday.com could be accessed by pointing a browser 1010 to the URLs of the Apache server 1050. This setup also enabled most Web traffic from www.usatoday.com to be watermarked at the Apache server machine 1050. It was noticed that the Apache reverse proxy 1050 did not catch all of the Web traffic between the Web servers of www.usatoday.com 1060 and the client 1010. In a separate experiment, it was found that about 11% of the Web traffic from www.usatoday.com, most of which was related to JavaScript, did not pass the Apache server 1050. Therefore, when the Web traffic from www.usatoday.com was watermarked at the Apache server machine 1050, only 89% of them were watermarked. In other words, when the Web traffic from www.usatoday.com reached the entry point(s) of anonymizer.com 1030, it consisted of watermarked traffic 1042 mixed with unwatermarked traffic 1046 (shown collectively as 1040).

From the client machine 1010, various Web pages of www.usatoday.com we browsed through anonymizer.com's Total Net Shield 1030. All of the HTTP traffic between the client machine and anonymizer.com 1030 was transferred through the SSH tunnel 1020. From the Apache server's 1050 point of view, all of the HTTP requests originated from hosts within anonymizer.com 1030. It was also noticed that one click from the client's browser could trigger multiple connections between the Apache server 1050 and multiple access points of anonymizer.com 1030.

The experiments were conducted between 10:00 am to 20:00 pm from Apr. 19 to 24, 2006. Chosen for use was a 500 ms time interval, 350 ms maximum delay, and 10 seconds offset for embedding 32-bit watermarks into the live Web traffic. Randomly generated were 100 32-bit watermarks, each of which had a Hamming distance of at least 12 to any other watermarks. Redundancy numbers 12, 14, 16, 18, and 20 were used, which required the Web traffic duration from 394 to 650 seconds. For each redundancy number, 20 separate experiments with 20 different watermarks were conducted. Table 1 in FIG. 11 shows the statistics of the Web traffic collected at the client machine 1010 and the Apache server machine 1050. For all redundancy numbers, both the average packet numbers and average packet rates at the client side were about 90% of those at the server side. However, the average packet sizes at the client side were only about 43% of the average packet sizes at the server side. As a result, the average information flow rates (in terms of bytes/second) at the client side were around 39% of those at the server side. This observation indicates that anonymizer.com had removed over 60% information from the Web traffic returned by www.usatoday.com. Such a drastic content filtering has made the inter-packet timing characteristics of the flows before and after the anonymizer's Total Net Shield appear completely different.

Figure 12:
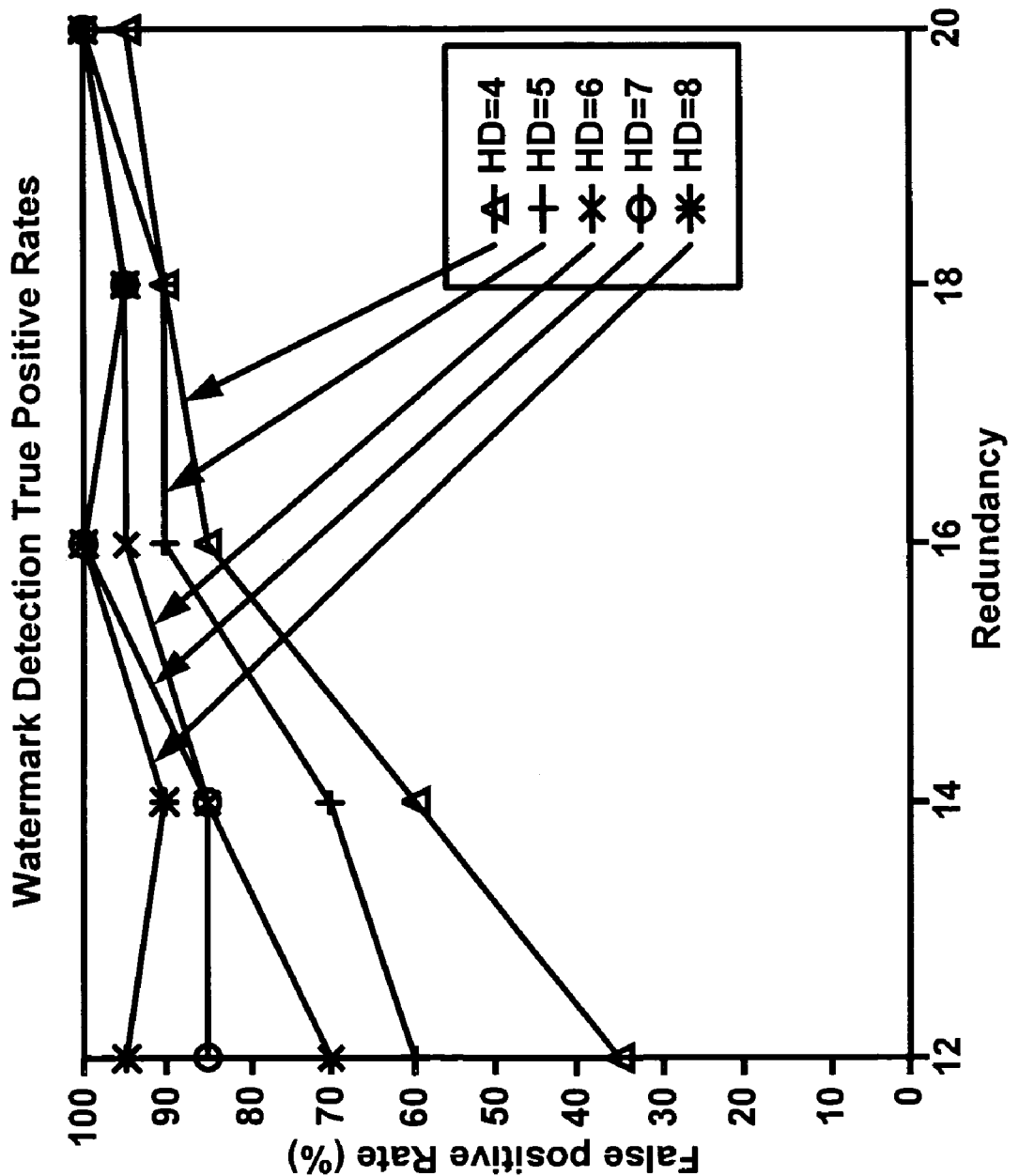
FIG. 12 is a plot showing watermark detection true positive rates during real-time experiments using an aspect of an embodiment of the present invention.
Figure 13:
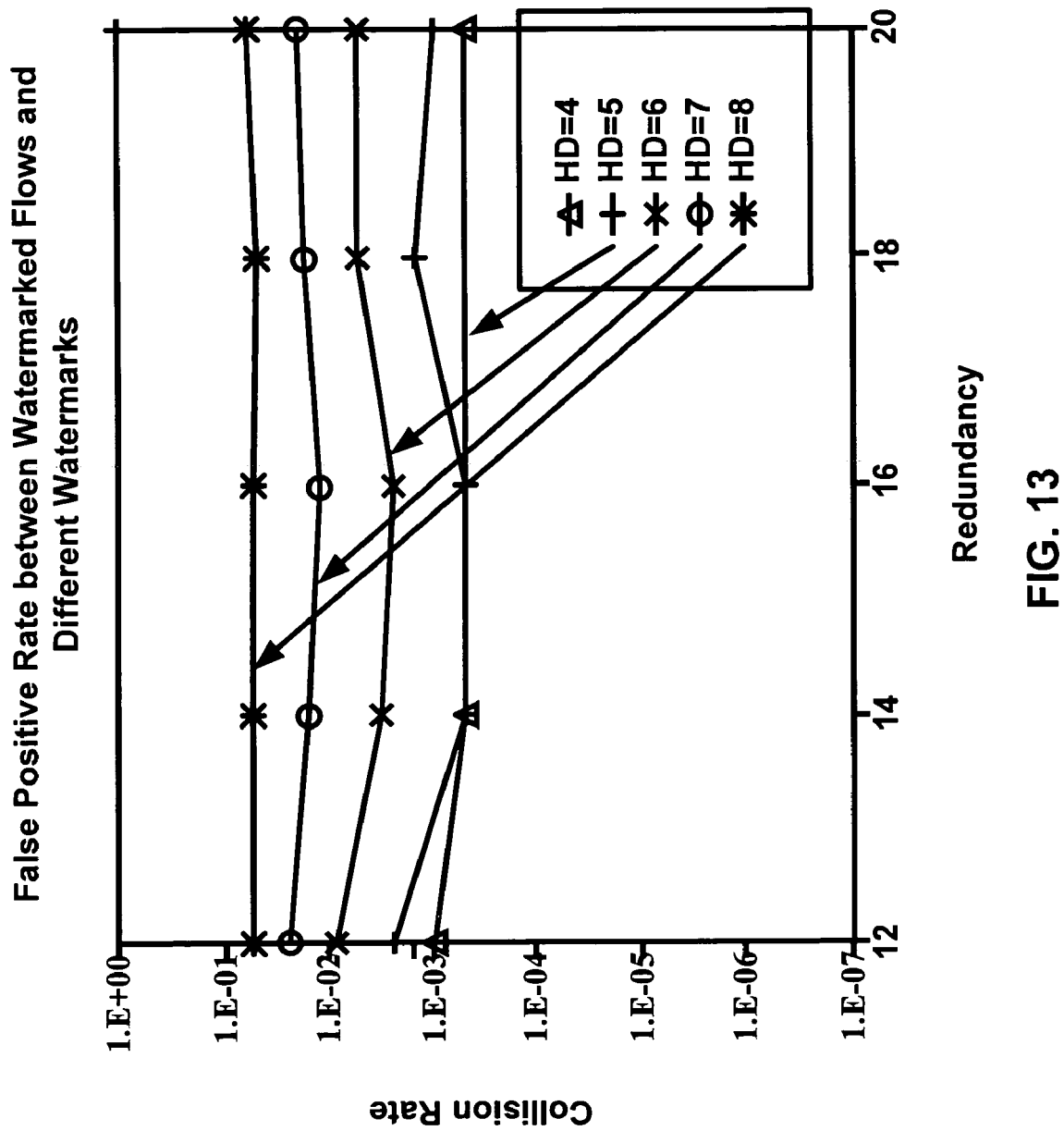
FIG. 13 is a plot showing false positive rates between watermarked flows and different watermarks during real-time experiments using an aspect of an embodiment of the present invention.

Despite of the significant flow transformations (i.e., repacketization, flow mixing, and packet dropping) and network delay jitter introduced by www.anonymizer.com to the Web traffic, surprisingly good results were achieved in linking the information sender and receiver through the test embodiment. When the 32-bit watermark was decoded from a network flow, a few bits were allowed to be mismatched with the watermark of interest. The number of allowed mismatched bits is called the Hamming distance threshold in the watermark decoding. FIG. 12 shows that a 100% watermark detection rate may be achieved with Hamming distance thresholds of 5, 6, 7, and 8, respectively, and redundancy of 20 from the Web traffic received at the client side. This only requires less than 11 minutes active browsing. With less than 61 2 minutes of active browsing traffic, the test was able to achieve a 60% watermark detection rate with a Hamming distance threshold of 5. By decoding each of the 100 watermarked network flows with 99 different watermarks, the watermark detection false positive rate was calculated. FIG. 13 shows that less than 0.3% watermark detection false positive rate was achieved a with a Hamming distance threshold of 5 for all redundancy levels. These results on live Web traffic confirmed that the flow watermarking technique can effectively penetrate the anonymizing service provided by www.anonymous.com.

Offline Experiments 100 watermarked flows were obtained by encoding a synthetic flow, generated by tcplib [8], with 100 different 32-bit watermarks. Redundancy number r=20, interval size T=500 ms, and timing adjustment a=350 ms were used. For each watermarked flow, 10 transformed flows were further generated by adding uniformly distributed chaff (or bogus packets) of rates between 10 to 100 packets/second. An attempt was then made to decode the 1000 transformed watermarked flows with correct watermarking parameters. For all rates of chaff, a 100% watermark detection rate was obtained while getting no more than a 0.5% watermark detection false positive rate. Since the average packet rate of the original unwatermark synthetic flow is only 0.8 packet/second, the watermarked flow had only about 512 packets. A chaff rate of 100 packets/second is over 120 times more than the packet rate of the original flow. Also tried was watermark decoding with normally distributed chaff, and virtually a 100% watermark detection rate was achieved when the normally distributed chaff was 4 times more than the original packets.

These results confirmed the claim that it is possible to uniquely identify a long network flow even if the amount of chaff added to the flow is many times more than the number of original packets as indicated by equations (18) and (19). This also implies that a flow can be uniquely identified even if it is mixed with other flows. The offline experiments also confirmed that when two watermarked flows are mixed, both watermarks could be successfully decoded from the mixed flow by our interval centroid based watermarking scheme.

Figure 14:
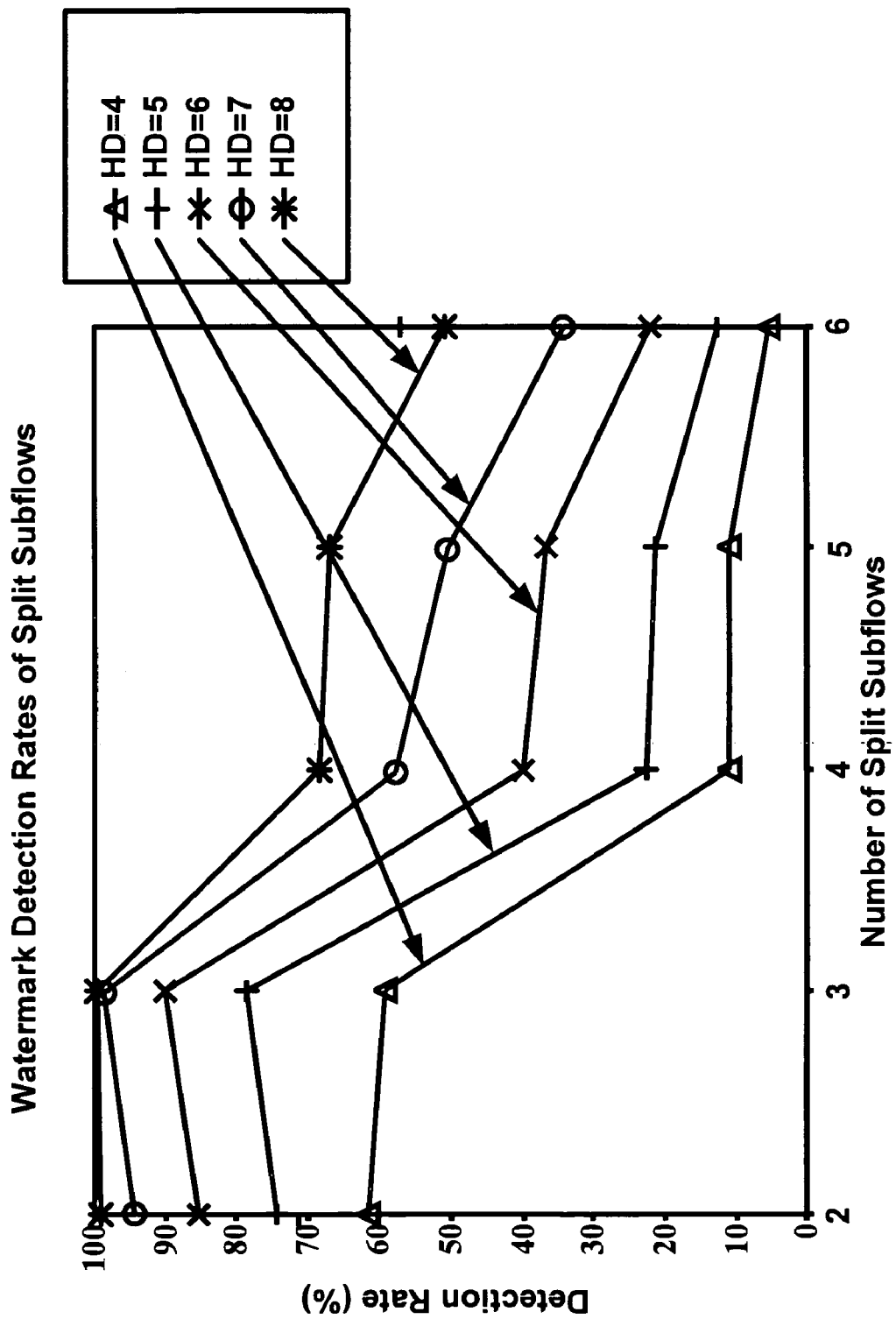
FIG. 14 is a plot showing watermark detection rates of split subflows during real-time experiments using an aspect of an embodiment of the present invention.

Each of the 100 watermarked flows (with 100 different watermarks) were randomly and uniformly split them into 2, 3, 4, 5, 6 subflows. An attempt was made to detect the watermark from each of the subflows. FIG. 14 shows the average watermark detection rates from various subflows under different Hamming distance thresholds. The figure indicates that splitting a flow into a few subflows does not make a flow unidentifiable as long as each subflow has a reasonable number of packets. In specific, 80% watermark detection rate was obtained with Hamming Distance threshold 5 on each of the 3 subflows that were split from a 512-packet flow. These results imply that a watermarked flow can be uniquely identified even if substantial portion of its packets have been dropped.

Figure 15:
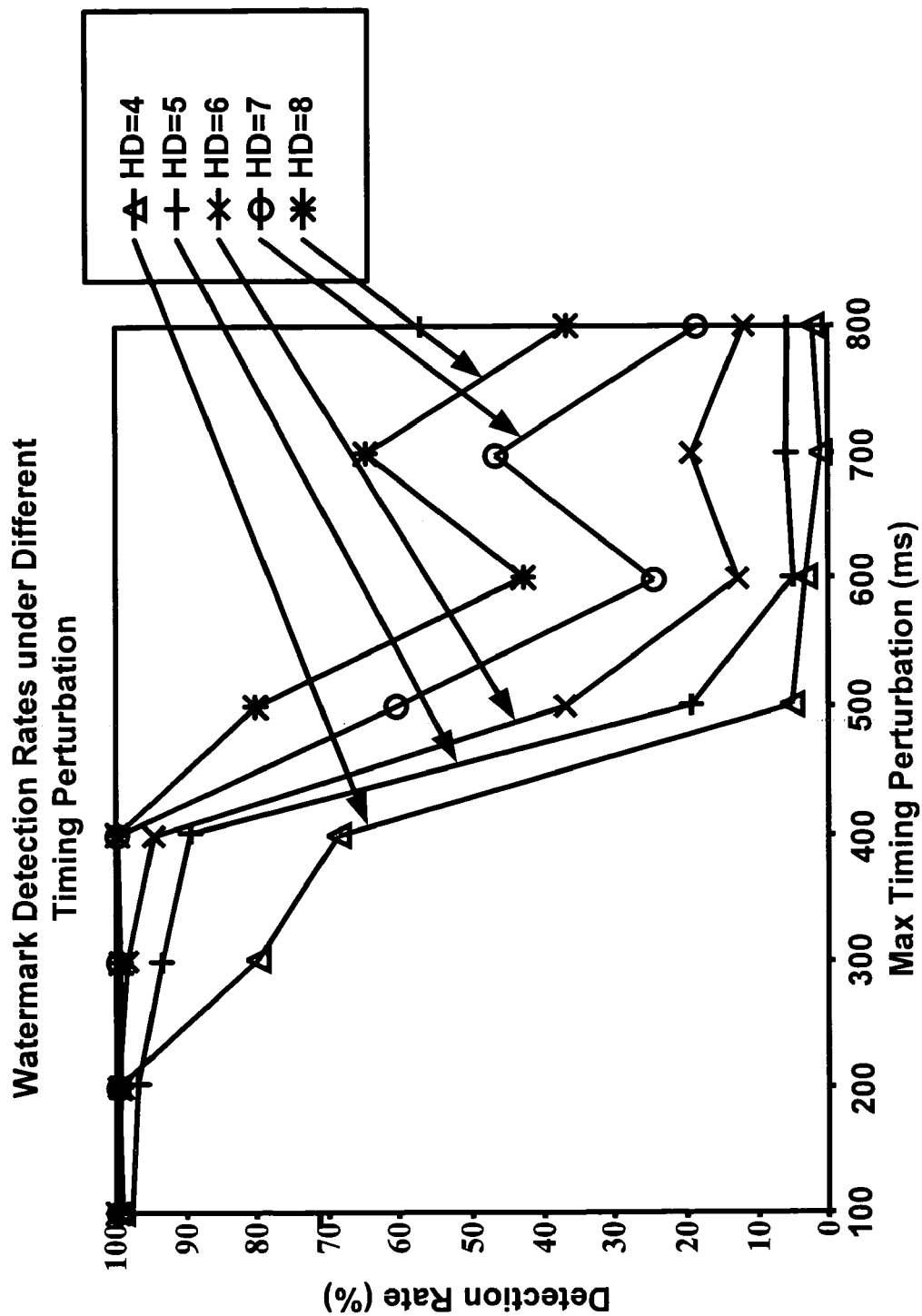
FIG. 15 is a plot showing watermark detection rates under different timing perturbations during real-time experiments using an aspect of an embodiment of the present invention.

To evaluate the robustness of the interval centroid based watermarking scheme against timing perturbation, uniformly distributed random timing perturbation were introduced to every packet of the 100 watermarked flows, and an attempt to detect the watermark from the perturbed flows was made. FIG. 15 shows the average watermark detection rates under various levels of random timing perturbation. It clearly indicates that the interval centroid based watermarking scheme is robust against any timing perturbation that is less than the interval size T.

Discussion

The experimental results confirm that the interval centroid based watermarking scheme is highly effective in identifying sufficiently long flows even after significant transformations have occurred. This technique allowed an effective link of an anonymized packet flow to the original packet flow. Here the number of packets in a packet flow is the fundamental limiting factor of the robustness of the flow watermarking scheme against various flow transformations. As shown in the realtime experiments on www.anonymizer.com, the flow watermarking technique only need about 5,500 packets to penetrate the best anonymizing service of www.anonymizer.com, which uses combinations of flow mixing, repacketization and substantial packet dropping in addition to timing perturbation due to network delay jitter. For single flow transformation such as adding cover traffic, packet dropping, flow mixing, flow splitting, flow merging, the flow watermarking technique could be effective on packet flows of only a few hundred packets.

Since it is possible to watermark a network flow from its source (e.g. from the Web site), one can make sure that whenever a flow is watermarked, only the watermarked flow is observable by others. Without access to the original unwatermarked flow, it would be very difficult, if possible at all, for any one to tell whether an arbitrary flow has been watermarked. In addition, the random grouping and assignment of intervals would make it difficult to detect the existence of watermark in a flow via statistical analysis of the interpacket timing characteristics.

Related Works

A number of low-latency anonymous communication systems [1, 24, 9, 25, 12, 15, 22, 4, 17] have been developed based on proxies or MIXes. Notably, Onion Routing [24], and its second generation, Tor [9], use public key encryption on a pre-determined sequence of proxies to protect the transport of TCP flows. Crowds [25] uses randomly selected proxies to hide the information's sender and receiver. However, none of these methods were designed to provide the unlinkability of sender and receiver. NetCamo [15] and Tarzan [12] used cover traffic to provide low-latency anonymous communication. A leading anonymous communication service provider, www.anonymizer.com [1], uses multiple proxies and a number of flow transformations (i.e., repacketization, packet dropping, flow mixing/merging) to provide its low-latency anonymous communication services. Instead of relying on proxies or MIXes, Hordes [27] leverages multicasting to provide sender anonymity. P5 [26] uses broadcast to provide sender-, receiver-, and senderreceiver anonymity assuming the adversary is passive.

There are also substantial works on attacking the privacy of Web application and low-latency anonymous communication systems. Felton and Schneider [11] identified an exploit of the Web cache which would allow a malicious Web site to infer whether its visitors have visited some other Web pages. Sun et al. [28] investigated how to statistically identify Web pages based on HTTP object size. Levine et al. [19] investigated passive timing-based attacks on low latency anonymizing systems with the assumption that the attacker could control both the first and the last mix in the anonymizing network. However, they only provided a theoretical analysis on general low-latency anonymizing models, and no real experiments or tests were performed on real systems. Murdoch et al. [20] proposed a low-cost timing attack on Tor [9] with the assumption that the attacker could control a corrupt Tor node. Wang et al. [29] proposed an active watermarking technique that can uniquely identify VoIP flows anonymized by www.findnot.com [2]. Compared with their watermarking method, embodiments of the present invention are able to self synchronize during the watermark decoding process which makes this watermarking scheme robust against such flow transformations as repacketization, packet dropping, flow mixing/merging/splitting in addition to timing perturbation.

Fu et al. [13] analyzed the effectiveness of traffic padding in resisting traffic analysis and showed that constant rate traffic padding is not optimal. Gogolewski et al. [14] investigated the implications when a user could only choose from a limited subset of all possible proxies in anonymous communication and showed that the anonymity could be degraded dramatically even if the set of all possible proxies was large. Kesdogan et al. [18] investigated the theoretical limits of the anonymity provided by the MIXes in the presence of omni-present passive adversary. However, their result is limited to the MIXes that do not introduce any bogus traffic or dummy messages. Compared with their analysis, embodiments of the present invention do not require the global monitoring capability, and the attack is effective even if the anonymizing system introduces bogus traffic or bogus messages.

Peng et al. [21] proposed an offline statistical method to detect the existence of watermark embedded in a network flow by method [30]. However, their watermark detection method assumes the watermark embedding follows some simple patterns and requires access to both the unwatermarked and watermarked flows to be effective. Since embodiments of the interval centroid based watermarking scheme 1) uses nontrivial random grouping and assignment of intervals and 2) could prevent others from accessing the unwatermarked flow by watermarking a flow from its source, it is unlikely that method [21] could detect our watermark from a given flow offline.

CONCLUSIONS

It is a common belief that drastic flow transformations would effectively disguise network flows and traffic padding is effective in anonymizing network flows. Tests with embodiments of the present invention have demonstrated that existing flow transformations, such as adding bogus packet, packet dropping, flow mixing, flow splitting, and flow merging, in addition to timing perturbation do not necessarily make a long network flow indistinguishable from others.

By using this novel flow watermarking technique, it was possible to uniquely identify a long flow even if it has gone through drastic flow transformations. In particular, the analysis has revealed a rather surprising result regarding the inherent limitation of flow transformations in anonymizing network flows—a sufficiently long network flow could be uniquely identified even if the amount of cover traffic (or bogus packets) is many times more than the original packets. In addition to demonstrating the theoretical limitations of the flow transformation based low-latency anonymizing systems, the first practical attack on a leading commercial anonymizing system was also developed. The real-time experiments on www.anonymizer.com have shown that one only needs a little over 10 minutes of active surfing traffic (about 5500 packets) to penetrate the Total Net Shield service provided by www.anonymizer.com.

The packet flow watermarking attack is based on the packet timing correlation between the original packet flow and the anonymized packet flow. Since no practical low-latency anonymizing system could remove all the mutual information from the packet timing domain, the flow watermarking attack may be applicable to all practical low-latency anonymous communication systems.

The following references are referred to as an aid to explain and enable the present embodiments: REFERENCES [1] Anonymizer Inc. http://anonymizer.com; [2] Findnot. http://findnot.com; [3] O. Berthold, H. Federrath, and M. Kohntopp. Project anonymity and unobservability in the internet. In Proceedings of Computers Freedom and Privacy, April 2000; [4] O. Berthold, H. Federrath, and S. Köpsell. Web MIXes: A system for anonymous and unobservable Internet access. In H. Federrath, editor, Proceedings of Designing Privacy Enhancing Technologies: Workshop on Design Issues in Anonymity and Unobservability, pages 115-129. Springer-Verlag, LNCS 2009, July 2000; [5] A. Blum, D. Song, and S. Venkataraman. Detection of interactive stepping stones: Algorithms and confidential bounds. In Proceedings of the 7th International Symposium on Recent Advances in Intrusion Detection (RAID 2004), October 2004; [6] D. Chaum. Untraceable electronic mail, return addresses, and digital pseudo-nyms. Communications of the ACM, 4(2), February 1981; [7] D. Chaum. The dining cryptographers problem: Unconditional sender and receipient untraceability. Journal of Cryptography, 1(1), 1988; [8] P. B. Danzig and S. Jamin. Tcplib: A library of tcp internetwork traffic characteristics. Technical Report USC-CS-91-495, University of Southern California, 1991; [9] D. Dingledine, N. Mathewson, and P. Syverson. Tor: The second generation onion router. In Proceedings of the 13th USENIX Security Symposium, August 2000; [10] D. Donoho, A. Flesia, U. Shankar, V. Paxson, J. Coit, and S. Staniford. Multiscale stepping stone detection: Detecting pairs of jittered interactive streams by exploiting maximum tolerable delay. In Proceedings of the 5th International Symposium on Recent Advances in Intrusion Detection (RAID 2002), pages 17-35, October 2002; [11] E. Felton and M. Schneider. Timing attacks on web privacy. In Proceedings of the 7th ACM Conference on Computer and Communications Security (CCS 2000), pages 25-32, November 2000; [12] M. Freedman and R. Morris. Tarzan: A peer-to-peer anonymizing network layer. In Proceedings of the 9th ACM Conference on Computer and Communications Security (CCS 2002), pages 193-206, 2002; [13] X. Fu, B. Graham, R. Bettati, and W. Zhao. On countermeasures to traffic analysis attacks. In Proceedings of the 2003 IEEE Workshop on Information Assurance, pages 188-195. IEEE, June 2003; [14] M. Gogolewski, M. Klonowski, and M. Kutylowski. Local view attack on anonymous communication. In Proceedings of ESORICS 2005, September 2005; [15] Y. Guan, X. Fu, D. Xuan, P. U. Shenoy, R. Bettati, and W. Zhao. Netcamo: Camouflaging network traffic for qosguaranteed mission critical applications. IEEE Transactions on Systems, Man, and Cybernetics, 31(4):253-265, July 2001; [16] Y. Guan, C. Li, D. Xuan, R. Bettati, and W. Zhao. Preventing traffic analysis for real-time communication networks. In Proceedings of Military Communications Conference (MILCOM 1999), pages 744-750. IEEE, November 1999; [17] A. Jerichow, J. Müller, A. Pfitzmann, B. Pfitzmann, and M. Waidner. Real-Time MIXes: A Bandwidth-Efficient Anonymity Protocol. IEEE Journal on Selected Areas in Communications, 16(4), 1998; [18] D. Kesdogan, D. Agrawal, V. Pham, and D. Rautenbach. Fundamental Limits on the Anonymity Provided by the MIX Technique. In Proceedings of the 2006 IEEE Symposium on Security and Privacy, pages 86-99, 2006; [19] B. Levine, M. Reiter, C. Wang, and M. Wright. Timing attacks in low-latency mix systems. In Proceedings of 8th Financial Cryptography, 2004; [20] S. Murdoch and G. Danezis. Low-cost traffic analysis of tor. In Proceedings of the 2005 IEEE Symposium on Security and Privacy, pages 183-195, May 2005; [21] P. Peng, P. Ning, D. S. Reeves. On the Secrecy of Timing-Based Active Watermarking Trace-Back Techniques. In Proceedings of the 2006 IEEE Symposium on Security and Privacy, pages 334-348, 2006; [22] A. Pfitzmann, B. Pfitzmann, and M. Waidner. ISDNmixes: Untraceable Communication with Very Small Bandwidth Overhead. In Proceedings of the GI/ITG Conference on Communication in Distributed Systems, pages 451-463, February 1991; [23] A. Pfitzmann and M. Waidner. Networks without user observability—design options. Computers and Security, 6(2):158-166, 1987; [24] M. Reed, P. Syverson, and D. Goldschlag. Anonymous connections and onion routing. IEEE JSAC Copyright and Privacy Protection, 1998; [25] M. K. Reiter and A. D. Rubin. Crowds: Anonymity for web transactions. ACM Transactions on Information and System Security, 1(1):66-92, November 1998; [26] R. Sherwood, B. Bhattacharjee, and A. Srinivasan. P5: A protocol for scalable anonymous communication. In Proceedings of the 2002 IEEE Symposium on Security and Privacy, May 2002; [27] C. Shields and B. N. Levine. A protocol for anonymous communication over the internet. In Proceedings of the 7th ACM Conference on Computer and Communications Security (CCS 2000), pages 33-42, 2000. [28] Q. Sun, D. R. Simon, Y.-M. Wang, W. Russell, V. N. Padmanabhan, and L. Qiu. Statistical identification of encrypted web browsing traffic. In Proceedings of the 2002 IEEE Symposium on Security and Privacy, pages 19-30, Berkeley, Calif., May 2002; [29] X. Wang, S. Chen, and S. Jajodia. Tracking anonymous peer to-peer voip calls on the internet. In Proceedings of the 10th ACM Conference on Computer and Communications Security (CCS 2005), pages 81-91, Alexandra, Va., November 2005. ACM; [30] X. Wang and D. Reeves. Robust correlation of encrypted attack traffic through stepping stones by manipulating of interpackets delays. In Proceedings of the 10th ACM Conference on Computer and Communications Security (CCS 2003), pages 20-29, 2003; [31] X. Wang, D. Reeves, and S. Wu. Inter-packet delay based correlation for tracing encrypted connnections through stepping stones. In Proceedings of the 7th European Symposium on Research in Computer Security (ESORICS 2002), LNCS-2502, pages 244-263. Springer-Verlag, 2002; [32] K. Yoda and H. Etoh. Finding a connection chain for tracing intruders. In Proceedings of the 6th European Symposium on Research in Computer Security (ESORICS 2000), October 2000; [33] Y. Zhang and V. Paxson. Detecting stepping stones. In Proceedings of the 9th USENIX Security Symposium, August 2000.

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as software routine(s) written in a computer language (such as C, C++, Fortran, Java, Basic, Matlab or the like) or modeling/simulation program(s) such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that the specific examples showed binary (i.e. two value watermark bit data encoded into packet flows. However, one skilled in the art will recognize that by adjusting the delays appropriately, one could use ranges in the probability distribution of the relative packet times to encode and decode more than two values for each watermark bit.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed:

1. A computer-readable storage media tangibly embodying a program of instructions executable by a computer to perform a method for applying an interval centroid based watermark to a packet flow intended to travel through a physical network, the packet flow containing a temporally separated sequence of packets, the packet flow having a duration $T_f$ and a starting point, the watermark having length l bits and a redundancy value r, each of the l bits representative of a value, the method comprising:

A) defining a quantity of 2n intervals, n being the product of length l and redundancy value r, the intervals dividing a duration $T_d$, duration $T_d$ being less than or equal to duration $T_f$, the 2n intervals beginning after an offset from the starting point;

B) selecting n intervals as group A intervals;

C) selecting n intervals as group B intervals, each of the group B intervals distinct from the group A intervals;

D) generating n interval pairs by grouping n unique group A intervals with n unique group B intervals;

E) assigning r quantity of the n interval pairs to each of the l bits;

F) increasing the relative packet time between each of the temporally separated sequence of packets in the group A intervals of the n interval pairs assigned to each of the l bits that are to represent a first bit value and the beginning of the same group A intervals; and G) increasing the relative packet time between each of the temporally separated sequence of packets in the group B intervals of the n interval pairs assigned to each of the l bits that are to represent a second bit value and the beginning of the same group B intervals.

2. The media as in claim 1, wherein the offset is greater than zero.

3. The media as in claim 1, wherein the packet flow is a part of a larger packet flow.

4. The media as in claim 1, wherein at least one of the packets in the temporally separated sequence of packets is encrypted.

5. The media as in claim 1, wherein at least some of the intervals in the temporally separated sequence of intervals are equal sized.

6. An interval centroid based watermark encoder, comprising:

A) a packet receiving module configured to receive a packet flow, the packet flow having a duration and a starting point, the packet flow containing a temporally separated sequence of packets, at least part of the packet flow separated into a temporally separated sequence of intervals, the temporally separated sequence of intervals beginning after an offset from the starting point, at least one of the temporally separated sequence of intervals being a group A interval, at least one other of the temporally separated sequence of intervals being a group B interval;

B) a watermark to interval mapping module configured to map each of at least one bit of a watermark to at least one unique pair of intervals, each of the at least one unique pair of intervals including a unique group A interval and a unique group B interval, each of the at least one bit of the watermark representative of a bit value; and C) a relative packet time adjustment module configured to:

i) increase the relative time between the temporally separated sequence of packets in each unique group A interval that is mapped to each of the at least one bit of the watermark that represents a first bit value and the beginning of the same each unique group A interval; and ii) increase the relative time between the temporally separated sequence of packets in each unique group B interval that is mapped to each of the at least one bit of the watermark that represents a second bit value and the beginning of the same each unique group B interval.

7. An encoder according to claim 6, wherein the offset o is greater than zero.

8. An encoder according to claim 6, wherein at least one of the packets in the temporally separated sequence of packets is encrypted.

9. An encoder according to claim 6, wherein at least some of the intervals in the temporally separated sequence of intervals are equal sized.

10. An encoder according to claim 6, wherein the packet flow is a part of a larger packet flow.

* * * * *